(12) United States Patent
Cunningham et al.

(10) Patent No.: US 12,305,061 B2
(45) Date of Patent: May 20, 2025

(54) APPARATUS AND METHODS FOR ALTERNATIVE COATINGS APPLICABLE TO METAL

(71) Applicant: G3 Enterprises, Inc., Modesto, CA (US)

(72) Inventors: John Cunningham, Tracy, CA (US); Kenneth Metzger, Cincinnati, OH (US); Timmy Sath Ka, Stockton, CA (US)

(73) Assignee: G3 Enterprises, Inc., Modesto, CA (US)

( * ) Notice: Subject to any disclaimer, the term of this patent is extended or adjusted under 35 U.S.C. 154(b) by 0 days.

(21) Appl. No.: 18/188,869

(22) Filed: Mar. 23, 2023

(65) Prior Publication Data
US 2023/0250309 A1    Aug. 10, 2023

Related U.S. Application Data

(62) Division of application No. 15/266,893, filed on Sep. 15, 2016, now Pat. No. 11,634,606.

(60) Provisional application No. 62/218,870, filed on Sep. 15, 2015.

(51) Int. Cl.
| | |
|---|---|
| B05D 1/28 | (2006.01) |
| B05D 1/40 | (2006.01) |
| B32B 15/085 | (2006.01) |
| C09D 123/08 | (2006.01) |

(52) U.S. Cl.
CPC ...... *C09D 123/0869* (2013.01); *B32B 15/085* (2013.01); *B05D 1/28* (2013.01); *B05D 1/40* (2013.01); *B05D 2202/25* (2013.01)

(58) Field of Classification Search
CPC ............. B05D 2205/25; C09D 123/0896
See application file for complete search history.

(56) References Cited

U.S. PATENT DOCUMENTS

| | | | |
|---|---|---|---|
| 3,738,991 A | 6/1973 | Reed | |
| 4,003,868 A | 1/1977 | Smith et al. | |
| 4,143,790 A * | 3/1979 | Ueno ............... | B65D 25/14 |
| | | | 428/35.8 |
| 4,156,035 A | 5/1979 | Tsao et al. | |
| 4,221,892 A | 9/1980 | Baron et al. | |
| 4,997,900 A | 3/1991 | Brinkman | |
| 5,098,751 A | 3/1992 | Tamura et al. | |
| 5,162,392 A | 11/1992 | Wool et al. | |
| 5,206,279 A | 4/1993 | Rowland et al. | |
| 5,234,150 A | 8/1993 | Yamamoto et al. | |
| 5,255,805 A | 10/1993 | Weiss et al. | |
| 5,318,850 A | 6/1994 | Pickett et al. | |
| 5,387,635 A | 2/1995 | Rowland et al. | |
| 5,631,307 A | 5/1997 | Tanaka et al. | |
| 5,672,675 A | 9/1997 | Green et al. | |
| 5,700,529 A | 12/1997 | Kobayashi et al. | |
| 5,759,703 A | 6/1998 | Neymark et al. | |
| 5,776,604 A | 7/1998 | Lu et al. | |
| 6,150,470 A | 11/2000 | Sullivan | |
| 6,180,200 B1 | 1/2001 | Ha et al. | |
| 6,852,792 B1 | 2/2005 | Capendale et al. | |
| 2002/0082524 A1 | 6/2002 | Anderson et al. | |
| 2003/0118737 A1 | 6/2003 | Valeri et al. | |
| 2003/0127415 A1 | 7/2003 | Carballido | |
| 2004/0024078 A1 | 2/2004 | Itoh et al. | |
| 2004/0067304 A1 | 4/2004 | Daly et al. | |
| 2005/0074623 A1 | 4/2005 | Vogel | |
| 2005/0164008 A1 | 7/2005 | Rukavina | |
| 2006/0063911 A1 | 3/2006 | Cayton et al. | |
| 2006/0111488 A1 | 5/2006 | Zhang et al. | |
| 2007/0042142 A1 | 2/2007 | O'Brien et al. | |
| 2007/0117916 A1 | 5/2007 | Anderson et al. | |
| 2007/0267134 A1 | 11/2007 | Konarski et al. | |
| 2007/0292705 A1 | 12/2007 | Moncla et al. | |
| 2008/0227927 A1 | 9/2008 | Schwendeman et al. | |
| 2010/0129563 A1 | 5/2010 | Herlihy et al. | |
| 2012/0125801 A1 | 5/2012 | Kainz et al. | |
| 2012/0129972 A1 | 5/2012 | Hall et al. | |
| 2013/0029057 A1 | 1/2013 | Laksin et al. | |
| 2013/0143039 A1 | 6/2013 | Wilbur et al. | |
| 2014/0039119 A1 | 2/2014 | Hong | |
| 2014/0080967 A1 | 3/2014 | Hayes | |
| 2014/0242346 A1 | 8/2014 | Nielsen et al. | |
| 2015/0101745 A1 | 4/2015 | Ramakrishnan et al. | |

(Continued)

FOREIGN PATENT DOCUMENTS

| | | |
|---|---|---|
| CN | 107987474 A | 5/2018 |
| DE | 3523860 A1 | 1/1987 |

(Continued)

OTHER PUBLICATIONS

Charles E. Hoyle, "Photocurable Coatings," Radiation Curing of Polymeric Materials, American Chemical Society, Dec. 28, 1990, 147:1-16.

Dow Brochure "Preparation of Aqueous Dispersions of PRIMACOR Copolymers" Printed Oct. 2012, 8 pages.

International Search Report and Written Opinion for International Patent Application No. PCT/UC2016/051979, dated Nov. 29, 2016 (11 pages).

International Search Report and Written Opinion for International Patent Application No. PCT/US2019/062491, dated Mar. 19, 2020 (15 pages).

(Continued)

*Primary Examiner* — Melissa A Rioja
(74) *Attorney, Agent, or Firm* — Dentons US LLP

(57) ABSTRACT

Apparatus and methods for alternative coatings applicable to metal are disclosed. According to one embodiment, an apparatus comprises a composition having, an ethylene acrylic acid copolymer; a neutralizing base; and water. The ethylene acrylic acid copolymer is about 15 percent to about 45 percent by weight concentration of the water. The apparatus further comprises metal coated with the composition.

17 Claims, 9 Drawing Sheets

(56) References Cited

U.S. PATENT DOCUMENTS

| | | |
|---|---|---|
| 2015/0239272 A1 | 8/2015 | Selepack et al. |
| 2016/0122581 A1* | 5/2016 | You .................. B65D 25/14 |
| | | 428/35.8 |
| 2017/0190927 A1 | 7/2017 | Mao et al. |
| 2020/0055977 A1 | 2/2020 | Mizuta et al. |

FOREIGN PATENT DOCUMENTS

| | | |
|---|---|---|
| EP | 1866371 B1 | 12/2007 |
| JP | S62141046 A | 6/1987 |
| JP | H05-505644 A | 8/1993 |
| JP | H09-278897 A | 10/1997 |
| JP | 2003-529624 A | 10/2003 |
| JP | 2005-342911 A | 12/2005 |
| JP | 2010-043186 A | 2/2010 |
| JP | 2013-500210 A | 1/2013 |
| JP | 2013-500211 A | 1/2013 |
| JP | 2013181096 A | 9/2013 |
| TW | 200940746 A | 10/2009 |
| WO | WO-1999/063017 A1 | 12/1999 |
| WO | WO-2006108657 A1 | 10/2006 |
| WO | WO-2011/011707 A2 | 1/2011 |
| WO | WO-2013/079719 A1 | 6/2013 |

OTHER PUBLICATIONS

U.S. Appl. No. 18/311,689, filed May 3, 2023, Apparatus and Methods Using Coatings for Metal Applications, Philips.

* cited by examiner

APPARATUS AND METHODS FOR ALTERNATIVE COATINGS APPLICABLE TO METAL

CROSS-REFERENCE TO RELATED APPLICATIONS

This application is a divisional of U.S. patent application Ser. No. 15/266,893, filed Sep. 15, 2016, which claims the benefit of U.S. Provisional Patent Application No. 62/218,870, filed Sep. 15, 2015, the entire contents of each of which are incorporated by reference herein.

BACKGROUND

Many industries, including the construction industry (e.g., roof and wall manufacturers), the transportation industry (e.g., automotive and tractor trailer manufacturers) and the packaging industry (e.g., wine screw-cap closure and soda can manufacturers) use pre-printed metals, such as stainless steel, tin, aluminum and plastics in the fabrication of their end products.

Traditional solvent-based coatings and inks have flexibility, good elongation properties and mar resistance which are useful features for metal raw materials requiring bending, folding, and/or elongating after coating. The solvents used in these coatings traditionally have high volatile organic compound (VOC) concentrations. These solvents are used to adjust the coating's rheological properties, such as viscosity, allowing for a coated product free from defects. The high VOC solvents also minimize the effect of residual grease or dirt on the pre-coated metal's surface by dissolving or dispersing the contaminant. This results in enhanced wetting of the metal's surface for coating homogeneity and good adhesion. Further, the solvents help with the coating levelling, consistency, flow, solids setting rates, and drying times.

Traditional high VOC coatings are cured or dried by solvent evaporation through heat and air convection. These solvent-based coatings solidify as the solvents are driven off the liquid layer applied to the substrate. During the coating solidification process, organic solvents are released into the process air resulting in VOC's in the process exhaust air stream. VOCs are limited or restricted in many geographic areas by local, state and federal regulations. VOCs may include a single compound or a mixture of volatile ethers, acetates, aromatics, glycol ethers, and aliphatic hydrocarbons. A manufacturer is typically required to use VOC controlling systems, such as rotor concentrators, regenerative catalytic oxidizers (RCO) and regenerative thermal oxidizers (RTO). These VOC controlling systems require high initial capital expenses and result in ongoing operating costs. Additionally, continual costs are incurred to maintain regulatory compliance including the regular analytical testing of treated air streams exiting the VOC controlling systems, administrative costs due to inspections, reporting costs, and fines imposed due to compliance issues.

Since a manufacturer is subjected to regulations encouraging the reduction or elimination of VOC emissions, low and zero VOC coatings have been developed as a replacement for solvent-based coatings. These replacement coatings have been introduced in various forms, including high solids, waterborne, solvent-free liquid energy cured (ultraviolet (UV) and electron beam (EB)), and 100% solids for hot-melt and powder coating applications. These alternative coatings are commercially available and successfully used for metal products that do not require extreme deformation. However, when these readily available alternative coatings have been applied to metal prior to extreme deformation, they have been shown to typically lose adhesion to the metal and/or to themselves (inter-coating adhesion failure) resulting in the coating flaking off of the part. These coatings have also been shown to lack the required elasticity resulting in coating fractures as the part is elongated, such as in a deep draw process.

Further, many traditional coatings contain 4,4'-(propane-2,2-diyl) diphenol (BPA) which is now under scrutiny when used in products that are in direct or indirect contact with foods and beverages. BPA is a common component in metal can coatings, which are applied to protect the food from directly contacting the can's metal surfaces.

Clearly, when foods or beverages are in direct contact with any packaging material, measurable amounts of the packaging material's components may migrate into food and can be consumed. The likelihood of this migration is evaluated by the FDA as a part of premarket reviews for food packaging materials. This evaluation is a component of the FDA's food contact notification program that assesses if the migration levels are safe.

Since BPA is common in many food packaging materials, heightened interest in the safe use of BPA for these applications has resulted in increased public awareness as well as scientific interest. As a result, many scientific studies have appeared in the public literature. Some of these studies have raised questions about the safety of ingesting the low levels of BPA that can migrate into food from food contact materials, such as coatings.

Although, the scientific data regarding BPA health effects is not conclusive, concerns regarding hormone disruption, cancer, and possibly heart problems have been raised. In fact, the United States FDA amended its food additive regulations abandoning the allowance for using BPA-based materials in baby bottles, Sippy cups, and infant formula packaging. Further considerations and regulatory actions are expected, so the elimination of BPA from packaging materials is prudent.

SUMMARY

Apparatus and methods for alternative coatings applicable to metal are disclosed. According to one embodiment, an apparatus comprises a composition having, an ethylene acrylic acid copolymer; a neutralizing base; and water. The ethylene acrylic acid copolymer is about 15 percent to about 45 percent by weight concentration of the water. The apparatus further comprises metal coated with the composition.

Other features and advantages will become apparent from the following detailed description, taken in conjunction with the accompanying drawings, which illustrate by way of example, the features of the various embodiments.

DETAILED DESCRIPTION

Figure 1:
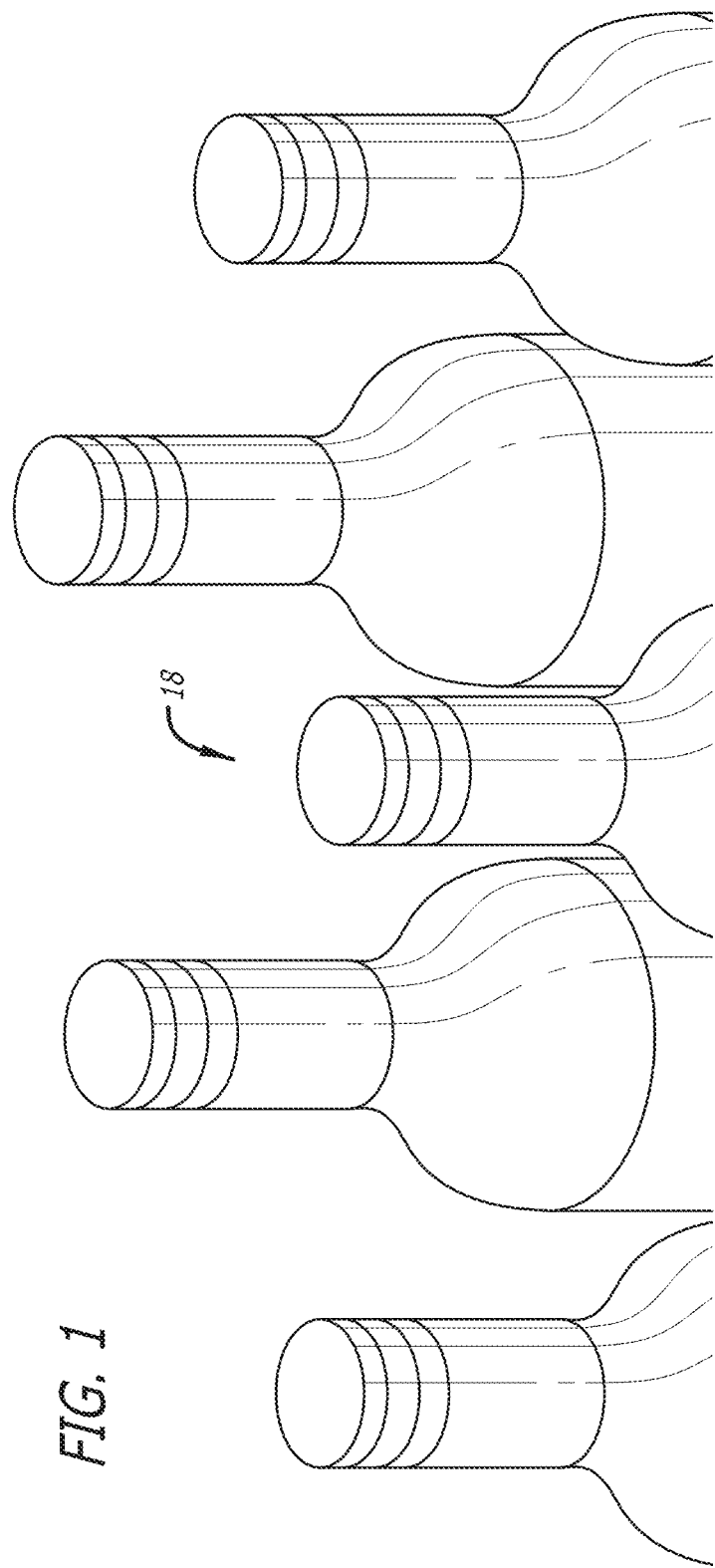
FIG. 1 illustrates exemplary aluminum wine closures.

The present disclosure describes environmentally friendly flat metal coatings and inks together with coating and ink application processes for metal parts including those requiring severe deformations such as acute bends and extensive stretching (e.g., deep draw metal parts) after the coatings and inks have been applied.

The present system and method includes applying a functional or functional and decorative coating, or coating/ink combination to metal (e.g., a metal sheet, a metal coil) for deep drawing applications using coating and ink material that contain little to no volatile organic compounds (VOC's). According to one embodiment, the present system and method includes applying a coating, or coating/ink combination to both sides of aluminum sheet metal used for the manufacture of a deep-draw screw-caps for beverage packaging applications. However, the coatings or coating and ink combinations can be applied to any type of metal.

Briefly, and in general terms, various embodiments are directed to a coating composition including an ethylene acrylic acid copolymer, a neutralizing base, and water. In one embodiment, the ethylene acrylic acid copolymer is about 15 percent to about 45 percent by weight of the total composition. In another embodiment, the ethylene acrylic acid copolymer may include an acrylic acid content of approximately 20.5 percent. 25 to about 100 molar percent of the acrylic acid functional groups may be neutralized with ammonium hydroxide. It has been shown that other bases can be used to neutralize the acrylic acid functional groups as well, such as potassium hydroxide or sodium hydroxide. The composition may have many applications, but in one embodiment, the composition is used as a primary coating to create tie-layer coatings, color coatings, over-varnish coatings, or as interior lacquer coatings for screw cap manufacturing.

In certain embodiments, about 25 molar percent of the acrylic acid functional groups are reacted with ammonium hydroxide. However, in other embodiments, 100 molar percent of the acrylic acid functional groups are reacted with ammonium hydroxide. In another embodiment, ammonium hydroxide and sodium hydroxide can be used in any combination to neutralize about 25 to about 100 molar percent of the acrylic acid functional groups. Further, about 25 to about 70 molar percent of acrylic acid functional groups may be reacted with ammonium hydroxide and sodium hydroxide. In a preferred embodiment, the ammonium hydroxide neutralizes about 30 molar percent of the acrylic acid functional groups and the sodium hydroxide neutralizes about 40 molar percent of the acrylic acid functional groups. In another embodiment, the ammonium hydroxide neutralizes about 0 to about 100 percent of the about 25 to about 70 molar percent of the acrylic acid functional groups neutralized. If 0 percent ammonium hydroxide is used to neutralize the acrylic acid, the 25 to 70 molar percent acrylic acid functional groups are neutralized using sodium hydroxide alone. If 100 percent ammonium hydroxide is used to neutralize the acrylic acid functional groups, no sodium hydroxide is used.

In yet another embodiment, the composition may include an ethylene acrylic acid copolymer dispersion that is about 15 percent by weight concentration in water. The ethylene acrylic acid copolymer dispersion may also be about 45 percent by weight concentration in water. In one embodiment, the ethylene acrylic acid copolymer may be PRIMACOR 5980I. Further, about 35 percent to about 45 percent of the PRIMACOR 5980I's acrylic acid functional groups may be neutralized using sodium hydroxide or potassium hydroxide.

In one embodiment, the composition may include a pigment having a concentration between 1 and 70 weight percent pigment to ethylene acrylic acid copolymer.

In another embodiment, the composition may include a wax having a concentration between 1 and 50 weight percent wax to ethylene acrylic acid copolymer. The wax may be carnauba wax, and the carnauba wax may be about 10 percent by weight concentration of the total coating solids.

Another embodiment disclosed herein is a method of forming a composition. The method includes mixing an ethylene acrylic acid copolymer with water at a 15 percent to 45 percent by weight concentration, and heating the ethylene acrylic acid copolymer/water mixture with a base to neutralize 25 to 100 molar percent of the acrylic acid functional groups. In one embodiment the mixture is heated to 110° C.

The method may also including mixing a pigment with the ethylene acrylic acid copolymer dispersion at a concentration of 1 to 70 weight percent pigment to ethylene acrylic acid copolymer. In another embodiment, the method may include mixing a wax with the ethylene acrylic acid copolymer dispersion at a concentration of 1 to 50 weight percent wax to ethylene acrylic acid copolymer.

In one embodiment, the ethylene acrylic acid copolymer includes an acrylic acid content of approximately 20.5 weight percent. Furthermore, the method for creating the dispersion includes neutralizing 25 to 100 molar percent of acrylic acid functional groups with any combination of ammonium hydroxide and sodium hydroxide. In a preferred embodiment, the ammonium hydroxide neutralizes about 30 molar percent of the acrylic acid functional groups and the sodium hydroxide neutralizes about 40 molar percent of the acrylic acid functional groups.

Yet another embodiment disclosed herein is directed to a method for coating a metal substrate. In one embodiment, the method includes coating the metal substrate with a first coating composition, wherein the first coating composition includes an ethylene acrylic acid copolymer dispersion in water at a 15 percent to 45 percent by weight concentration created by neutralizing 25 to 100 molar percent of the acrylic acid functional groups. The method also includes curing the first coating composition on the metal substrate by heating the metal substrate from ambient temperature, approximately 75° F., to 100° F. in 5 seconds. In yet another embodiment, the first coating composition on the metal substrate is cured by heating the metal substrate from ambient temperature, approximately 75° F., to 250° F. in 120 seconds. Other temperatures and times may be used for the curing process.

In one embodiment, the method may include coating the metal substrate with a second coating composition. The second coating composition may include an ethylene acrylic acid copolymer dispersion in water at a 15 percent to 45 percent by weight concentration created by neutralizing 25 to 100 molar percent of the acrylic acid functional groups and a pigment having a concentration between 1 and 70 weight percent pigment to the ethylene acrylic acid copolymer.

In another embodiment, the method may include coating the metal substrate with a third coating composition. The third coating composition may include an ethylene acrylic acid copolymer dispersion in water at a 15 percent to 45 percent by weight concentration created by neutralizing 25 to 100 molar percent of the acrylic acid functional groups, and a wax having a concentration between 1 and 50 weight percent wax to ethylene acrylic acid copolymer.

Another embodiment of the method includes coating the metal substrate with coating compositions that contain no volatile organic compounds (VOC's).

Another embodiment of the method includes coating the metal substrate with coating compositions that have BPA non-intent (NI) status.

To address the shortcomings of prior solutions, the present embodiments describe alternative coatings and coating/ink combinations, along with methods of applying the alternative coating and coating/ink combinations to metal (e.g., a metal sheet, and a metal coil) using environmentally friendly solvents (zero or very low VOC) or solvent free (zero VOC) coatings and coating/ink combinations, while maintaining the metal's ability to bend, fold and stretch without damage to the coating or coating/ink on the metal's surface.

FIG. 1 illustrates an exemplary aluminum wine closure 18, according to one embodiment. Individual aluminum wine closures of this type may have dimensions of 30 millimeter diameter by 60 millimeter long and may be formed using a deep draw process on flat metal sheets precoated with a solvent based coating on both sides of the metal.

Figure 2:
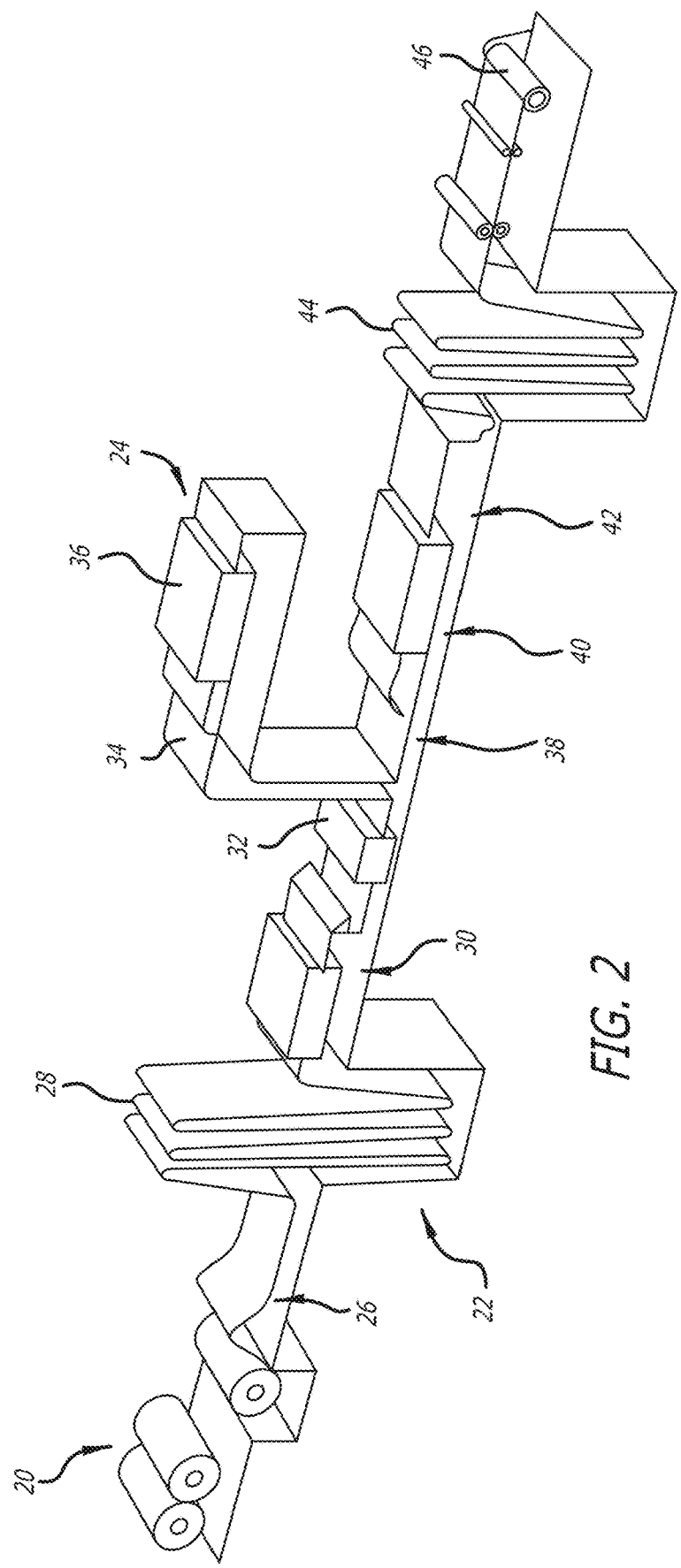
FIG. 2 illustrates an exemplary system for applying a coating to coiled metal, according to one embodiment.

A coating is applied to a metal substrate using a coil or a flat sheet coater. FIG. 2 illustrates an exemplary system for applying a coating to coiled metal. The metal substrate 20 is staged in coil form at the feed to the coil coater process 24. The metal substrate 20 is unwound at an uncoiler 26 and passed to an entrance accumulator 28 to ensure consistent feed into the coating process train. The uncoiled metal substrate 20 is then passed to a pre-treatment station 30, where the metal's surface is cleaned, possibly treated to increase its surface energy, and possibly coated with a tie-coating, such as a size or base coat. If the metal was coated with a tie-coating, it is then dried at a drying station 32 before being sent to the coil coater 24. The coil coater 24 includes a prime coater station 34 that applies the main color or functional coating to the metal substrate. The color or functional coating on the metal substrate is then cured in a curing oven 36. Next, at a top coat station 38 of the coil coater 24, a top coat such as a protective over-varnish is applied to the metal substrate, and is cured in a finish oven 40. The substrate then might enter a water quench station 42 to quickly cool the coated metal, before entering an exit accumulator 44 that allows for continually re-coiling the coated metal at the proper tension and rewind speed.

Figure 3:
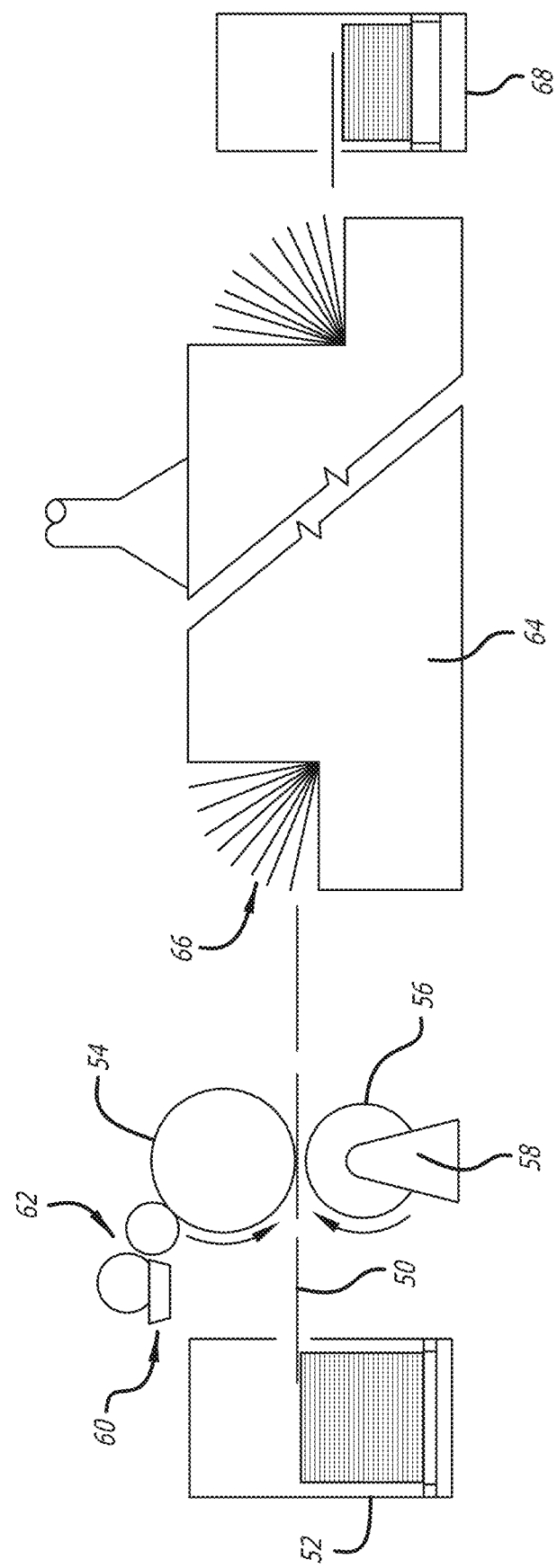
FIG. 3 illustrates an exemplary system for applying a coating to a metal sheet, according to one embodiment.

The coating processes may apply multiple coating layers onto one or both sides of the metal substrate in one or multiple passes. FIG. 3 illustrates an exemplary system for applying a coating to a metal sheet, according to one embodiment. As shown in FIG. 3, metal sheets 50 may be stored in a sheet or plate feeder 52. From the sheet feeder 52, each metal sheet 50 is fed to a conveyor (not shown). The sheets may be treated to clean and increase their surface energy (not shown) prior to coating application at the application roller 54. During the coating application, the sheet is supported underneath by a pressure roller 56. As shown in FIG. 3, the conveyor transfers the metal sheet to a base coater 58 operation, where the metal sheet 50 is fed between the application roller 54 and the pressure roller 56. A coating tray 60 transfers coating material to the application roller 54 using a series of rollers 62, and the application roller applies the coating to each metal sheet as it passes. After the coating material is applied at the base coater 58, the metal sheet 50 is sent into a wicket oven 64 that includes wickets 66 that hold and convey individual metal sheets through the oven at a specified rate. The coated metal sheets are heated, dried, and cooled in the wicket oven 64 at specified temperatures and are then transferred to a sheet or plate stacker 68.

A coating is a liquid that may contain, but is not limited to, binders, pigments, dyes, or waxes applied to the interior and/or exterior of a substrate (e.g., aluminum metal) for decorative, functional, or decorative and functional purposes. The coating may be applied using techniques to completely cover the substrate, or it may be applied to specifically cover selective parts of the substrate. These include tie-layer coatings, including clear and base—relatively low pigment containing—coatings, applied to assist adhesion of subsequent coatings to the metal, color coatings for decorative purposes and over-varnish coatings to protect the color coats and printed artwork.

Coatings that are applied to the interior and exterior surfaces of a metal packaging component may have different functions depending on the application of the component. For example, an interior coating on a metal packaging component directly contacting the food product protects the metal from corrosion by the food contents and protects the food from metal contamination. Interior coatings may also contain agents to aid in the functionality of the finished products. For example, slip agents, such as waxes, may be used in the case of screw cap closures to reduce the torque required to remove the cap from a bottle. Exterior coatings are applied for decoration, to protect the package or packaging component against corrosion, and to protect the printed design from marring or abrasion.

Figure 4A:
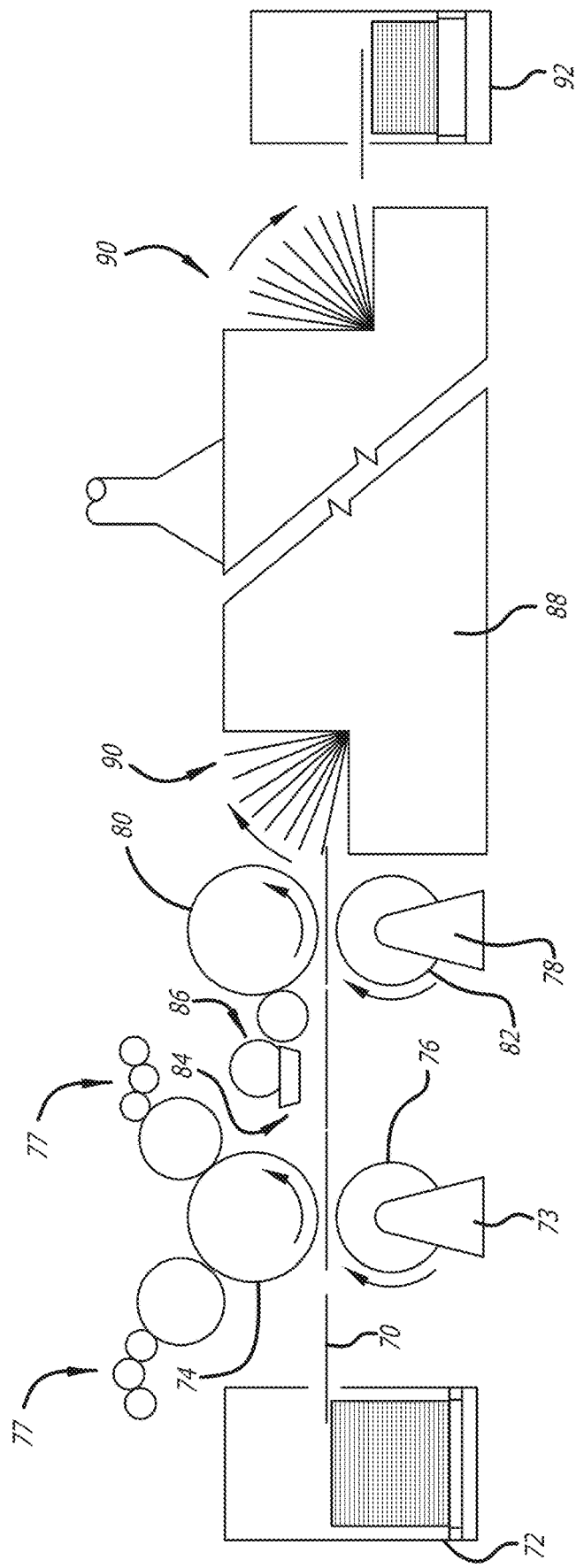
FIG. 4A illustrates an exemplary system for applying inks to a metal sheet, according to one embodiment.
Figure 4B:
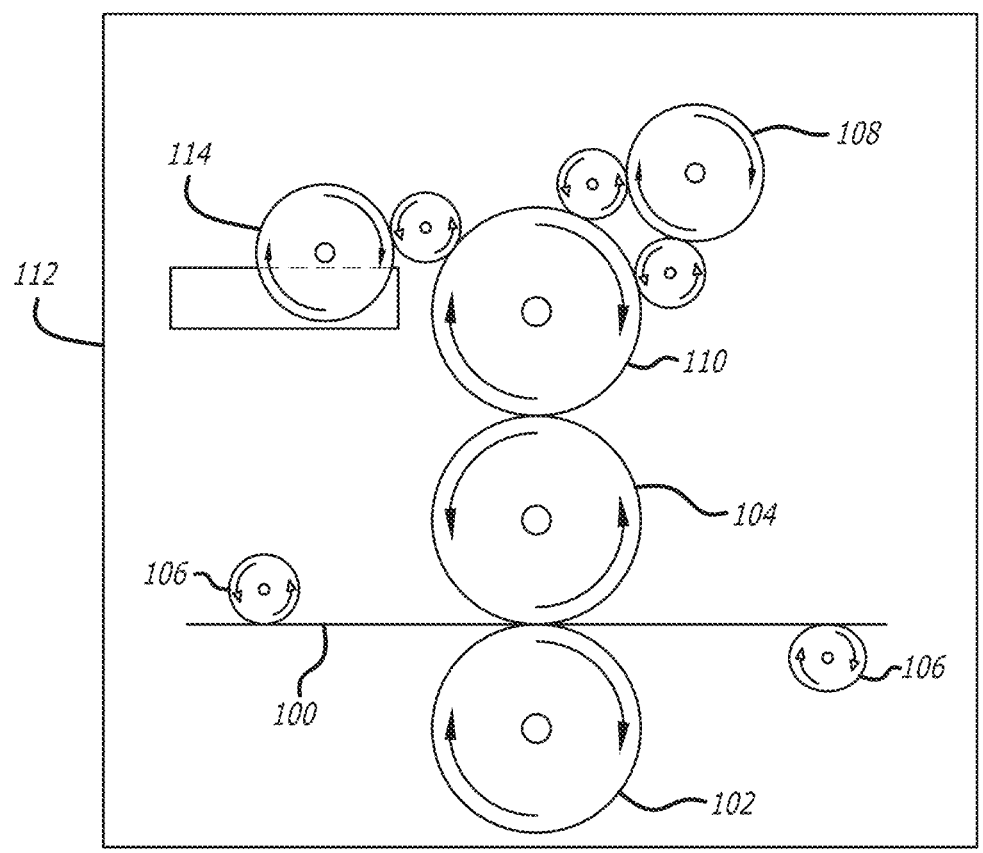
FIG. 4B illustrates another exemplary system for applying inks to a metal sheet, according to one embodiment.

Ink is applied to a flat metal sheet either in direct contact with the metal or over a coating previously applied to the metal using a sheet-fed offset lithography printer. FIGS. 4A and 4B illustrate exemplary systems for applying inks to a metal sheet. In one embodiment, offset printing consists of an inked image being transferred from a plate to a blanket and then transferred to the metal's printing surface. These systems may be used with a lithographic process, employing a hydrophobic ink, including ultraviolet curable inks, and water-based fountain solution applied to an image carrier. The ink is applied to the image carrier via rollers along with a fountain solution. The non-printing area of the image carrier attracts the fountain solution that repels the ink keeping the non-printing areas ink-free. Inks may be applied to the surface of cured coatings to add solid color or decorative elements to the metal. These inks can then be cured and protected by over-coating with a clear over-varnish coating.

As shown in FIG. 4A, metal sheets 70 may be stored in a sheet or plate feeder 72. From the sheet feeder 72, each metal sheet 70 is fed to a conveyor (not shown) and then to a lithograph coater 73. There may be a blanket cylinder 74 on one side of the conveyor and a pressure roller 76 on the opposite side of the conveyor at the lithograph coater 73. Ink applicators 77 transfer ink through a series of rollers to the blanket cylinder 74. As shown in FIG. 4, the conveyor transfers the metal sheet to the lithograph coater 73, where the metal sheet 70 moves between the blanket cylinder 74 and the pressure roller 76, and the blanket cylinder 74 applies the coating to each metal sheet as it passes by on the conveyor. After receiving the inked image at the lithograph coater 73, the metal sheet 50 may be sent to an over-varnish coater 78 that includes an application roller 80 and a pressure roller 82 on opposite sides of the conveyor. A varnish tray 84 storing over-varnish is applied to the application roller 80 through a series of rollers 86, and the over-varnish is then applied to the metal sheets by way of the application roller 80. After receiving varnish, the coated metal sheets are then sent to a wicket oven 88 that includes wickets 90 that that hold individual metal sheets. The coated metal sheets are dried in the wicket oven 88 and then transferred to a sheet or plate stacker 92.

As shown in the embodiment of FIG. 4B, metal sheets 100 are fed into an offset printing assembly between an impression cylinder 102 on one side and an offset cylinder 104 on the opposite side of the metal sheet 100. Additional rollers 106 may also be used to help feed the metal sheet through the printing assembly. Ink applicators 108 transfer ink through a series of rollers to a plate cylinder 110 as shown in FIG. 4B. A water tray 112 storing water (or composition including water) is applied to the plate cylinder 110 through a series of rollers 114. From the plate cylinder 110, the ink is transferred to the offset cylinder 104. When the metal sheet 100 is between the impression cylinder 102 and the offset cylinder 104, the offset cylinder 104 applies the ink coating to the metal sheet 100 as it passes through the offset printing assembly. As with the above embodiment described in FIG. 4A, the metal sheet including the inked image may be sent to an over-varnish coater, and may then be sent to an oven for curing.

The present system provides one or more desirable properties for the coating and coating/ink combinations including, but not limited to, decreased curing energy, decreased curing time, strong adhesion to metal, good solvent rub resistance, good abrasion resistance, extreme flexibility, ability to elongate more than 250%, acceptable blocking resistance in real-world environments, and BPA non-intent (NI) status. The present system may include a pre-coating metal treatment process to remove hydrophobic contaminants and to increase the surface energy, featuring, but not limited to, direct flame, ozone, corona, and/or plasma. The present system may also include a coating application process, featuring, but not limited to, roll, reverse roll, gravure, dry offset, wet offset, slot die, curtain, knife, rod, pressure rod and spray coater technologies. The system may further include a post-application curing process for the coating, including, but not limited to, the removal of environmentally friendly solvents, such as water using forced convection, forced convection heated air, induction heating, induction heating combined with forced air, IR energy, IR energy combined with forced air, radio frequency and radio frequency combined with forced air. Further, the present system may include a UV ink printing process to apply decoration to the cured waterborne coatings. The ink printing process includes but is not limited to, offset lithography, flexo, inkjet, xerography, and gravure. The process to cure the ink includes but is not limited to UV light generated from mercury vapor lamps, iron doped mercury vapor lamps, gallium doped mercury vapor lamps, fluorescent lamps, and LEDs.

Figure 5:
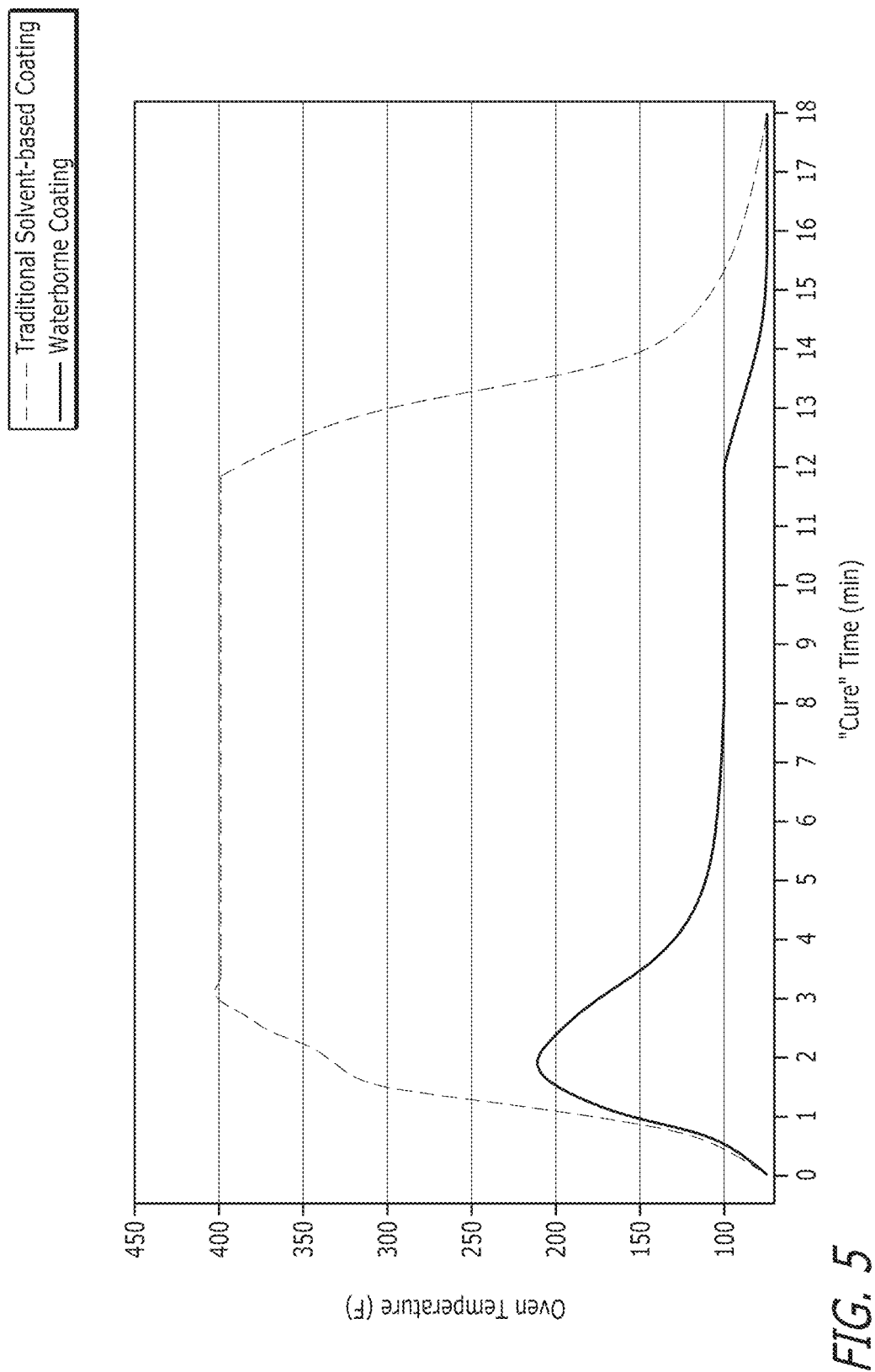
FIG. 5 illustrates a chart comparing a commercial oven curve for an EAA copolymer based waterborne coating versus a traditional solvent based coating, according to one embodiment.

Using this technology results in environmentally friendly coatings and inks requiring lower energy and time to cure than traditional high VOC solvent coatings and inks. An example for this improved curing efficiency for coating application can be seen in FIG. 5 comparing the commercial oven curves for the technology disclosed herein (waterborne coating) and the traditional solvent based coating system.

The metals coated and decorated using the technologies described herein will function well on flat sheets and have excellent performance properties for challenging deep draw applications. Further, regarding food safety, the cured coatings can be designed to have BPI-NI status.

In accordance with one embodiment, a primary waterborne coating composition is provided comprising ethylene acrylic acid (EAA) copolymer, a neutralizing base, and deionized or softened water. A solid EAA copolymer in pellet form is agitated in heated water containing a base. The base, which can include a combination of compounds, is added at a prescribed concentration to react with a desired percent of the EAA copolymer's carboxylic acid groups. Various relative amounts of EAA, base(s) and water are used in conjunction with agitation and dispersing temperatures to change the resulting waterborne coating characteristics, including the EAA particle size and coating viscosity. For example, by changing the acrylic acid neutralization from 30 to 70 molar percent, and EAA copolymer concentration in water from 20 to 43 percent by weight (agitation intensity and dispersing temperatures were held constant) stable EAA dispersions having average particle sizes of 15 to 450 nm and viscosities of 75 to 3000000 cP were made. The resulting waterborne dispersion can then be tuned to perform optimally in various coating application processes.

The resulting EAA coating adheres strongly to aluminum but it also has a tendency to strongly adhere to itself. This property of EAA coatings is well known and is the reason that one of its primary uses in industry is as a heat-seal coating. In a sheet metal coating application, where adhesion of individual sheets to one another is not desired, this property can lead to a defect known as "blocking". Blocking occurs when neighboring aluminum sheets in a stack adhere to one another. Effectively, the sheets become bonded to each other resulting in commercial processing difficulties or the need for the raw material being discarded as waste. The disclosed process addresses this issue with a straightforward modification to the coatings in the layers contacting each other within the stack of flat sheets along with potential coating manufacturing, and coating application process condition changes.

Depending on the finished part's requirements, the EAA coated flat sheet metal can be coated with a single coating containing pigments or other additives, such as waxes, in order to change the appearance or performance properties.

Although the EAA coating can be used as a single coat, this technology is amenable to multi-coat systems. Depending on the metal or the decorative color requirements, a tie-layer consisting of a clear size-coating or "lightly" pigmented base coat might be necessary. If a color coating is required and does not adhere to the metal satisfactorily, a clear size-coating comprised of the primary EAA dispersion can be applied and film-formed to the metal first. This coating is designed to adhere strongly to aluminum and to a second coating comprised of the primary EAA dispersion mixed with any number of compatible pigments, e.g. a color coating. Further, if the color coating requires protection, or has a tendency to cause blocking defects, a third coating can be applied comprised of the primary EAA coating mixed with a compatible wax dispersion. Finally, the food contact side of the metal may be coated with a BPA-NI EAA coating mixed with food contact approved pigments and/or waxes to improve processing efficiencies or performance on the integrated package.

Another aspect includes the use of free radical or cationic UV inks to print over the EAA coating applied to the flat metal. Although free-radical UV coatings are not commonly known to have elongation properties required for use in deep draw processes, the inventors have discovered that they may be used successfully if the oligomer/monomer system is designed to strongly adhere to the EAA coating prior to, and during, the metal elongation process. In essence, properly formulated UV inks "ride" the high elongation EAA coating, allowing them to function in deep draw applications. Using this approach, a size coating, base coating, or primary color coating might be overprinted with 100 percent solids UV inks, as a flood- or spot-print, to add overall color coverage or selective artwork to the metal prior to deep drawing. This technology can include the printing of specialty artwork designed to reveal the image after the metal is distorted (distortion printing), such as in a deep draw application.

According to one embodiment, commercially available waterborne coatings such as Michelman 4983R (Ethylene acrylic acid copolymer dispersion), Michelman P1853 (Ethylene acrylic acid copolymer dispersion), Michelman 4983RHS (High solids, larger particle size version of Michelman 4983R), Michelman MDU20 (Proprietary polymer dispersion), Dow Adcote 37P295 (Ethylene vinyl acetate copolymer dispersion), Dow Adcote 37-220 (Ionomer of ethylene copolymer dispersion), BASF Joncryl 60 (Ammoniated solution of styrene acrylic resin), BASF Joncryl 74A (Acrylic copolymer emulsion), BASF Joncryl 77 (Acrylic copolymer emulsion), BASF Joncryl 89 (Acrylic copolymer emulsion), BASF Joncryl 1695 (Acrylic copolymer emulsion), DOW HYPOD™ 8503 (High molecular weight polyolefin dispersion), DOW HYPOD™ 1001 (High molecular weight polyolefin dispersion), and DOW HYPOD™ 9105 (High molecular weight polyolefin dispersion) may be used alone or in combination as a coating for application to flat sheet or coil metal.

According to one embodiment, a waterborne coating is made using an ethylene acrylic acid copolymer having an acrylic acid content of approximately 20.5 weight percent. Solid EAA pellets are mixed in deionized water between approximately 15 and 45 percent by weight concentration with ammonium hydroxide to neutralize 25 to 100 molar percent of the acrylic acid functional groups. The mixture is heated to approximately 110 C (although it may be heated between about 85 C and 140 C) under agitation. The resulting EAA dispersion is used as a primary coating for application to flat sheet or coil metal.

In one embodiment the waterborne coating is made using an ethylene acrylic acid copolymer having an acrylic acid content in a range from 19.5 to 21.5 weight percent. In this embodiment, solid EAA pellets are mixed in deionized water at a 45 percent by weight concentration with ammonium hydroxide to neutralize 25 molar percent of the acrylic acid functional groups. The mixture is heated to 110 C under agitation. The resulting EAA dispersion is used as a primary coating for application to flat or coil metal.

In another embodiment, a waterborne coating is made using an ethylene acrylic acid copolymer having an acrylic acid content in a range of approximately 20.5 weight percent. Solid EAA pellets are mixed in deionized water at a 15 percent by weight concentration, heated to 110 C, and under agitation 100 molar percent of the acrylic acid functional groups are neutralized using ammonium hydroxide. The resulting EAA dispersion is used as a primary coating for application to flat sheet or coil metal.

According to another embodiment, waterborne base and color coatings are made by mixing appropriate pigments, at concentrations ranging from 1 to 70 weight percent pigment to EAA copolymer solids, into EAA dispersions created using EAA pellets having approximately 19.5 to 21.5 weight percent acrylic acid mixed with deionized water at 20 to 43 weight percent EAA in water and having the acrylic acid functional groups neutralized from 30 to 70 molar percent using ammonium hydroxide. The resulting EAA dispersions are used as base or color coatings for application to flat sheet or coil metal.

According to another embodiment, waterborne protective over-varnish coatings are made by mixing compatible waxes, at concentrations ranging from 1 to 50 weight percent wax to total EAA copolymer solids, into EAA waterborne dispersions created using EAA pellets having from 19.5 to 21.5 weight percent acrylic acid mixed with deionized water at 20 to 43 weight percent EAA in water and having the acrylic acid functional groups neutralized from 30 to 70 molar percent using ammonium hydroxide. The resulting EAA dispersions are used as protective over-varnish coatings that also minimize the potential for blocking in coated flat metal sheets or coils.

According to another embodiment, a waterborne coating is made using an ethylene acrylic acid copolymer having an acrylic acid content from 19.5 to 21.5 weight percent. Solid EAA pellets are mixed in deionized water at 25 percent by weight EAA with ammonium hydroxide and sodium hydroxide to neutralize 70 molar percent of the acrylic acid functional groups where the sodium hydroxide is used to neutralize 40 molar percent of the acrylic acid functional groups and the ammonium hydroxide is used to neutralize the remaining 30 molar percent. The mixture is heated to 110 C under agitation. The resulting sodium ionomer EAA dispersion is used as a primary coating for application to flat metal or coil.

According to another embodiment, waterborne base and color coatings are made by mixing appropriate pigments, at concentrations ranging from 1 to 70 weight percent pigment to total EAA copolymer solids, into EAA waterborne dispersions created using EAA pellets having approximately 20.5 percent by weight acrylic acid mixed with deionized water at 25 to 40 weight percent EAA and having the acrylic acid functional groups neutralized from 30 to 70 molar percent using ammonium hydroxide and sodium hydroxide. The sodium hydroxide is used to neutralize from 0 to 100 percent of the overall 30 to 70 molar percent neutralized. The resulting EAA sodium ionomer dispersions are used as base or color coatings for application to flat or coil metals.

According to another embodiment, waterborne protective over-varnish coatings are made by mixing compatible waxes, at concentrations ranging from 1 to 50 weight percent wax to total coating solids, into EAA waterborne dispersions created using EAA pellets having from 19.5 to 21.5 weight percent acrylic acid mixed with deionized water at 25 to 40 weight percent EAA and having the acrylic acid functional groups neutralized from 30 to 70 molar percent using ammonium hydroxide and sodium hydroxide. The sodium hydroxide is used to neutralize from 0 to 100 percent of the overall 30 to 70 molar percent neutralized. The resulting EAA sodium ionomer dispersions are used as protective over-varnish coatings that also minimize the potential for blocking in coated flat metal sheets or coils.

According to a preferred embodiment, waterborne protective over-varnish coatings are made by mixing compatible waxes, at concentrations ranging from 1 to 50 weight percent wax solids to total EAA copolymer solids, into EAA waterborne dispersions created using EAA pellets having from 19.5 to 21.5 percent by weight acrylic acid mixed with deionized water at 20 to 30 weight percent EAA and having the acrylic acid functional groups neutralized from 65 to 75 molar percent using ammonium hydroxide and sodium hydroxide. The sodium hydroxide is used to neutralize from 50 to 70 percent of the overall 65 to 75 molar percent neutralized. The resulting EAA sodium ionomer dispersions are used as protective over-varnish coatings that minimize the potential for blocking in coated flat metal sheets or coils.

According to certain embodiments, the wax used in the protective over-varnish may be carnauba or oxidized high density polyethylene. In other embodiments, the wax used in the over-varnish may be a fatty amide or bisamide, montan ester, microcrystalline, paraffin, oxidized low density polyethylene or Fisher-Tropsch wax. These waxes may be used individually or in combination.

In certain embodiments, the metal to be coated may be in coil form or sheet form. The metal may be treated, immediately prior to coating, using a flame to remove residual surface contaminants, in certain embodiments. The metal may also be treated to modify its surface energy by using plasma treatment, ozone treatment, or corona treatment, prior to coating.

In certain embodiments, the metal may be aluminum, such as an 8011 alloy, or the like.

In certain embodiments, the coating may be applied to the coil or sheet metal using a direct roll coater, a reverse roll coater, a rod coater, a pressure rod coater, a spray coater, a slot die coater, or a curtain coater.

According to one embodiment, the coating may be applied at about 0.25 milligrams per square inch to about 15 milligrams per square inch. As used in this disclosure, "about" or "approximately" means within 10% of the given amount. Furthermore, the color coating may be applied directly to the metal surface or to a clear (size coating) or lightly pigmented (base coating) tie-layer on the metal surface. In one embodiment, the color layer may be protected by an over-varnish coating.

In certain embodiments, the coating dryer may be a hot-air forced convection oven using a wicket conveyance system for metal sheets or a hot-air forced convection oven where the sheets remain flat.

In certain embodiments, an infrared heating system with forced air convection, or an induction heating system with forced air convection where the metal sheets are conveyed using a wicket conveyance system or where the sheets remain flat. Any other drying system may be used as is known in the art.

During the coating drying process, metal (e.g., aluminum) coil or sheet may be heated from ambient temperature, approximately 75 F, to a temperature between about 100° F. and about 500° F. in the oven. In a preferred embodiment, an aluminum coil or sheet is heated from ambient temperature to a temperature between about 150° F. and about 250° F. in the oven. The aluminum coil or sheet may be heated from ambient temperature to the desired final temperature in approximately 5 to 120 seconds. In the preferred embodiment, the aluminum coil or sheet is heated from ambient temperature to the desired temperature in 20 to 80 seconds.

In certain embodiments, the aluminum coil or sheet coated with a waterborne polymer may be overprinted using a free-radical UV ink or a cationic UV ink.

Example 1: Primary EAA Coating Manufacture

An EAA dispersion was prepared using a 2 liter Parr Series 4520 bench top stirred reactor equipped with quartz windows for viewing.

425 grams of Primacor 59801 EAA (The Dow Chemical Company, 2030 Dow Center, Midland, Mich. 48674), 1220.4 grams deionized water, 54.6 grams of Aqua Ammonia 28% item 511561-1 (Hi Valley Chemical, 1134 W 850 N, Centerville, Utah 84014) (actual assay found to be 25.7% by measuring specific gravity at 60 F and converting to weight percent ammonia) was added to the reactor vessel to produce 1700 grams of dispersion. The reactor bomb was assembled and the vent closed, placed in the heating mantle and heated, with mixing at 450 to 500 rpm until the reactants reached 60-80 C, at which time the mixing speed was increased to 675 rpm. The temperature continued to ramp to 110 C with constant agitation and the reactor vent closed. The batch was held at 110 C temperature for one hour resulting in all of the EAA being dispersed.

After the EAA was completely dispersed, the heating mantle was removed and agitation reduced to 300-450 rpm. Cooling was then initiated by directing 20-26 C water through the internal cooling coil until the EAA dispersion temperature was reduced to 28-35 C. The reactor was then vented and the dispersion poured into a stainless steel beaker and allowed to de-aerate as it cooled to room temperature. After approximately 24 hours, the EAA dispersion was passed through a 0.8 mm stainless steel strainer into a polyethylene storage container. The dispersion was translucent in appearance.

Example 2: Primary EAA Sodium Ionomer Coating Manufacture

An EAA sodium ionomer dispersion was prepared using a 2 liter Parr Series 4520 bench top stirred reactor equipped with quartz windows for viewing.

435.4 grams of Primacor 59801 EAA (The Dow Chemical Company, 2030 Dow Center, Midland, Mich. 48674), 1201.5 grams deionized water, 24.5 grams of Aqua Ammonia 28% item 511561-1 (Hi Valley Chemical, 1134 W 850 N, Centerville, Utah 84014) (actual assay found to be 25.7% by measuring specific gravity at 60 F and converting to weight percent ammonia) and 38.6 grams Sodium Hydroxide, 50% Solution, product code 110014 (Brenntag Specialties Inc., 1 Camino Sobrante #215, Orinda, Calif. 94563) was added to the reactor vessel to produce 1700 grams of dispersion. The reactor bomb was assembled and the vent closed, placed in the heating mantle and heated, with mixing at 450 to 500 rpm until the reactants reached 60-80 C, at which time the mixing speed was increased to 675 rpm. The temperature continued to ramp to 110 C with constant agitation and the reactor vent closed. The batch was held at 110 C temperature for one hour resulting in all of the EAA being dispersed.

After the EAA was completely dispersed, the heating mantle was removed and agitation reduced to 300-450 rpm. Cooling was then initiated by directing 20-26 C water through the internal cooling coil until the EAA dispersion temperature was reduced to 28-35 C. The reactor was then vented and the dispersion poured into a stainless steel beaker and allowed to de-aerate as it cooled to room temperature. After approximately 24 hours, EAA dispersion was passed through a 0.8 mm stainless steel strainer into a polyethylene storage container. The dispersion was translucent in appearance.

Example 3: Michelman 4983R—White Base Coating Manufacture

Weighed 95 grams of the Michem® Prime 4983R (Michelman, Inc., 9080 Shell Road, Cincinnati, Ohio) dispersion, into a Uline (part number S-19520) ½ pint tin-plated steel can. Using a pipette, weighed 5 grams of Sun Chemical (WHD-9507) "Sunsperse White 6" (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 4: Primary EAA—White Base Coating Manufacture

Weighed 95 grams of the EAA dispersion, created in Example 1, into a Uline (part number S-19520) ½ pint tin-plated steel can. Using a pipette, weighed 5 grams of Sun Chemical (WHD-9507) "Sunsperse White 6" (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 5: Primary EAA Sodium Ionomer—White Base Coating Manufacture

Weighed 95 grams of the EAA dispersion, created in Example 2, into a Uline (part number S-19520) ½ pint tin-plated steel can. Using a pipette, weighed 5 grams of Sun Chemical (WHD-9507) "Sunsperse White 6" (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial blade impeller set at 700 rpm. The mixing speed was gradually increased from 700 to 2000 rpm. Once at 2000 rpm, continued to mix for another 60 seconds. The can was then closed for storage using a tin-plated steel lid.

Example 6: Michelman 4983R—Color Coating Manufacture

Weighed 87 grams of the Michem® Prime 4983R EAA dispersion into a Uline (part number S-19520) ½ pint tin-plated steel can. Using a pipette, weighed 13 grams of Sun Chemical (BPD-0015) "Sunsperse Blue 15:3" (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 7: Primary EAA—Color Coating Manufacture

Weighed 87 grams of the EAA dispersion, created in Example 1, into a Uline (part number S-19520) ½ pint tin-plated steel can. Using a pipette, weighed 13 grams of Sun Chemical (BPD-0015) "Sunsperse Blue 15:3" (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 8: Primary EAA Sodium Ionomer—Color Coating Manufacture

Weighed 87 grams of the EAA dispersion, created in Example 2, into a Uline (part number S-19520) ½ pint tin-plated steel can. Using a pipette, weighed 13 grams of "Sunsperse Blue 15:3", BPD-0015 (Sun Chemical Corporation, 35 Waterview Boulevard, Parsippany, N.J. 07054) into the dispersion. Immediately, mixed the coating and pigment dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 9: Carnauba Wax Dispersion Manufacture 550 grams of "GC-704 CWE Carnauba Wax Emulsion" (Green Chem Coatings, Bishop, Ga.) was placed in 1200 mL Vollrath stainless steel beaker and agitated at 400 rpm at ambient temperature. 330 grams of deionized water were slowly added to result in a stable 25% solids carnauba wax emulsion. The dispersion was mixed for 60 seconds at ambient temperature and then passed through a 0.8 mm stainless steel strainer into a polyethylene container for storage.

Example 10: Primary EAA—Over-Varnish Coating Manufacture

Weighed 90 grams of the EAA dispersion, created in Example 1, into a Uline (part number S-19520) ½ pint tin-plated steel can. Using a pipette, weighed 10 grams of "Carnauba Wax Dispersion" created in Example 9 into the dispersion. Immediately, mixed the coating and wax dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 11: Primary EAA Sodium Ionomer—Over-Varnish Coating Manufacture

Weighed 90 grams of the EAA dispersion, created in Example 2, into a Uline (part number S-19520) ½ pint tin-plated steel can. Using a pipette, weighed 10 grams of "Carnauba Wax Dispersion" created in Example 9 into the dispersion. Immediately, mixed the coating and wax dispersion together using a Cole-Parmer mixer (Model #50006-01) fitted with a 30 mm diameter 316 SS axial impeller set at 700 rpm. The mixing speed was gradually increased from 700 to 2000 rpm. Once at 2000 rpm, continued to mix for another 60 seconds. The can was then closed for storage using a tin-plated steel lid.

Example 12: Lab Coating Aluminum Panels—Michelman 4983R Color Coating

Cut 4" by 15" lab sheets from 33.33" by 35.72" commercial sheets of 0.009" thick 8011 alloy aluminum. Flamed lab panels using a propane torch to remove hydrophobic contaminants and to increase their surface energy. Within 24 hours after flaming, carefully placed a lab sheet onto a drawdown plate. Secured the lab sheet onto the drawdown plate using a spring loaded clip. Placed a clean Meyer #10 rod across the width of the lab sheet. Carefully pipetted approximately 5 mL of the "Example 6" color coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them cool to ambient temperature. Stored coated lab sheets for further testing and deep draw performance.

Tested the flat lab sheets for "Coating Thickness", "Sutherland Rub", "Taber Coating Adhesion", and "Blocking".

The coating thickness was determined by measuring 6 locations on the 4"×15" panel using an ElektroPhysik MiniTest 720 (ElektroPhysik Dr. Steingroever GmbH & Co. KG, Pasteurstr. 15, 50735 Cologne, Germany).

Figure 6:
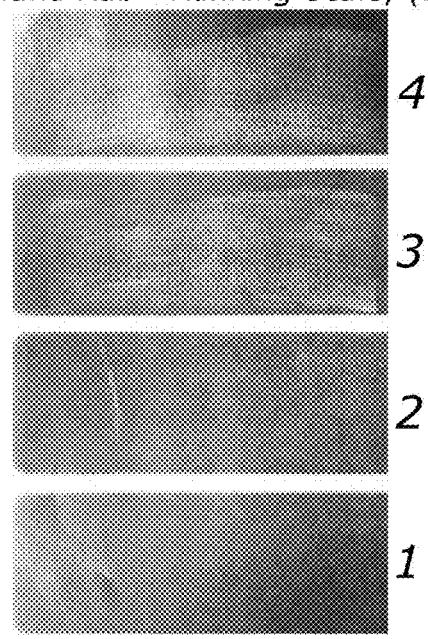
FIG. 6 illustrates a Sutherland Rub test ranking scale from 1—best, to 4—worst, according to one embodiment.

The Sutherland rub was performed by cutting the coated panel into a 6" by 2.5" rectangle, securing the rectangle onto the rubber base pad of the Sutherland rub tester, Model 2000 (Danilee Co., LLC, 27223 Starry Mountain, San Antonio, Tex. 78260), attaching a piece of the 3M 261X lapping film (Electronics Markets Materials Division 3M Electronics 3M Center, Building 21-1W-10, 900 Bush Avenue St. Paul, Minn. 55144) to the 4 lb weight, placing the 4 lb weight onto the 6"×2.5" rectangle panel, and rubbing the sample for 500 cycles at a speed setting of 4. The samples were then ranked using the Sutherland Rub ranking scale shown in FIG. 6. In all of the results, the lower score is better than a higher score.

Figure 7:
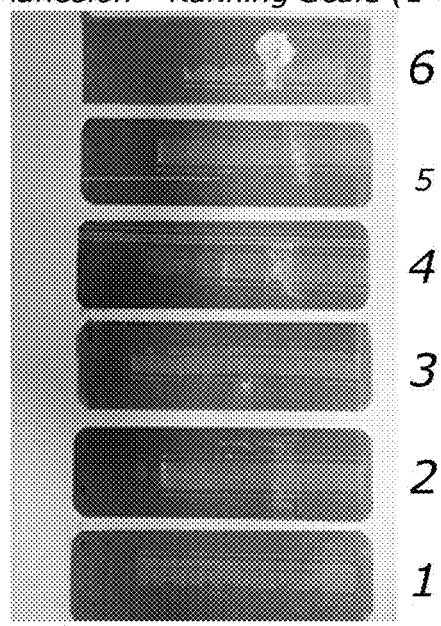
FIG. 7 illustrates a Taber Adhesion test ranking scale from 1—best to 6—worst, according to one embodiment.

The Taber coating adhesion test was performed by cutting the coated panel into a 6" by 1.5" rectangle, cutting a cross-hatch pattern through the coating using a Gardco adhesion test multi-toothed cutter (Paul N. Gardner Company Inc., 316 N.E. First Street, Pompano Beach, Fla. 33060), placing a fresh strip of PA-280630 tape (manufactured by Interpolymer and sold by Paul N. Gardner Company Inc.) over the grid and smoothing the tape over the cross-hatch with a finger, allowing the tape to fully adhere to the sample for 60 to 120 seconds after smoothing, and rapidly pulling the tape off of the sample - using a force parallel and close to the panel's surface. The samples were then ranked using the Taber Adhesion scale shown in FIG. 7. For the results, the lower score is better than a higher score.

The blocking test was performed by cutting the coated panel into 5-4" by 2.5" rectangles, stacking the rectangles on top of each other, placing the stack in an oven pre-heated to 129 F, placing 11 pounds of weight on top of the stack, leaving the samples in the oven for 4.5 hours, pulling the samples from the oven, and ranking the samples for blocking, within 5 minutes of removing from oven, using the following scale (all results are lower-the-better—LTB):

Blocking - Ranking Scale

| Rank | Description |
| --- | --- |
| 1 | No Blocking |
| 2 | Slight blocking - commercially useable |
| 3 | Significant blocking throughout stack - likely not commercially useable |
| 4 | Severe blocking for all sheets - commercially unusable |
| 5 | Solid black - commercially unusable |

Results are shown in Table A.

TABLE A

Flat Lab sheet Test Responses

| Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) n = 4 |
| --- | --- | --- | --- |
| 6.20 | 4.0 | 6.0 | 3.35 ± 0.10 |
| 6.25 | 4.0 | 6.0 | |
| 6.00 | 4.0 | 3.0 | |
| 6.45 | 4.0 | 1.0 | |
| 6.00 | 4.0 | 1.0 | |
| 6.65 | 4.0 | 1.0 | |

Created a 30 mm diameter by 60 mm long shell from the flat sheet using a lab 3-draw press.

Applied a small amount of mineral oil onto a clean lint-free cloth and rubbed both sides of the coated sheet to apply a light layer of lubricating mineral oil. Placed the lubricated sheet into the 1st draw station and created a 1st draw shell measuring ~52 mm in diameter by ~29 mm in height.

If the first draw shell was acceptable, moved it to the second draw station and placed the shell onto the draw tool. Created the second draw shell measuring ~39 mm in diameter and ~45 mm in height.

If second draw shell was acceptable, moved it to the third draw station and placed the shell onto the draw tool. Created the third draw shell measuring ~30 mm in diameter and ~60 mm in height.

For shells with coating that survived the drawing from flat sheet to the 30×60 form, a "Top Rub" and "Solvent Rub" test was performed to determine the coating's durability.

Figure 8:
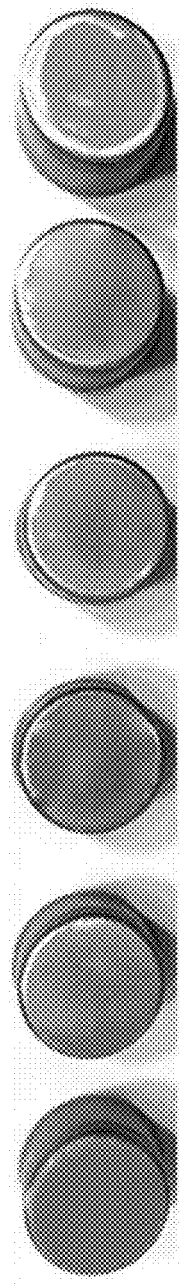
FIG. 8 illustrates a Top-of-Shell Rub test ranking scale from 1—best to 6—worst, according to one embodiment.

The shell Top Rub testing was performed by placing an abrasive cardboard piece onto the rubber base pad of the Digital Ink Rub Tester, Model 10-18 (Testing Machines, Inc., 40 McCullough Drive, New Castle, Del. 19720), securing the shell holder fixture in the tester, placing the shell with the top-side contacting the cardboard into the fixture, and running the rub tester for 500 cycles with no pause. Rubbed shells were ranked using the scale shown in FIG. 8. For this ranking, lower scores are better than higher scores.

Figure 9:
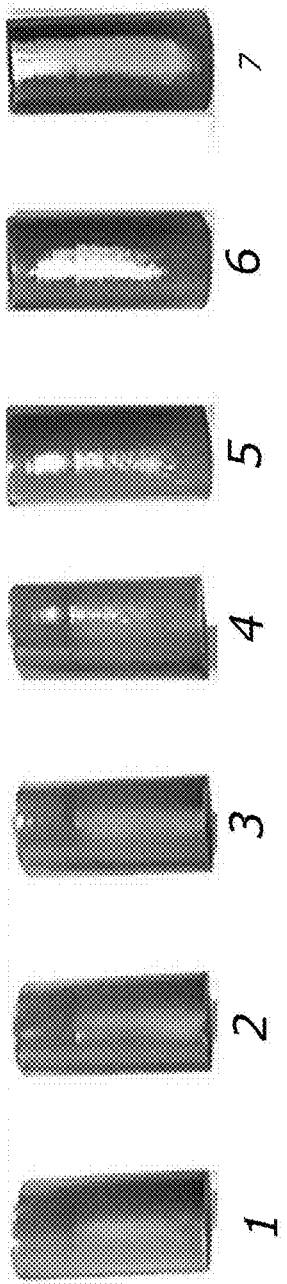
FIG. 9 illustrates a 70% Isopropyl Alcohol Rub test ranking scale from 1—best to 7—worst, according to one embodiment.

The shell Solvent Rub testing was performed by placing a shell onto a glass bottle having a 1680 Glass Packaging Institute finish, and hand rubbing, using very firm pressure, the shell with a ~2" by ~3" rectangle paper towel soaked with 70% isopropyl alcohol (IPA) back and forth for 30 cycles. The rubbed shells were ranked using the scale shown in FIG. 9. For this ranking, lower scores are better than higher scores.

Results are shown in Table B.

TABLE B

Shelf Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 6.0 | 5.0 |
| 5.0 | 5.0 |
| 6.0 | 6.0 |
| 6.0 | 4.0 |
| 3.5 | 4.8 |

Example 13: Lab Coating Aluminum Panels—Primary EAA Color Coating

Cut 4" by 15" lab sheets from 33.33" by 35.72" commercial sheets of 0.009" thick 8011 alloy aluminum. Flamed lab panels using a propane torch to remove hydrophobic contaminants and to increase their surface energy. Within 24 hours after flaming, carefully placed a lab sheet onto a drawdown plate. Secured the lab sheet onto the drawdown plate using a spring loaded clip. Placed a clean Meyer #10 rod across the width of the lab sheet. Carefully pipetted approximately 5 mL of the "Example 7" color coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them to cool to ambient temperature. Stored coated lab sheets for further testing and deep draw performance.

Tested the flat lab sheets for Taber Coating Adhesion, Sutherland Rub, Coating Thickness, and Blocking using the methods described in Example 12. Results are shown in Table C.

TABLE C

Flat Lab Sheet Test Responses

| Coating Thickness | Sutherland Rub Test (500 Cycles) Ranking Scale (1-4 LTB) | Taber Scratch Cross Hatch Test Ranking Scale (1-6, LTB) | Capmetal Sheet Blocking Ranking Scale (1-5, LTB) n = 4 |
|---|---|---|---|
| 5.95 | 4.0 | 6.0 | 2.80 ± 0.59 |
| 6.50 | 4.0 | 5.0 | |
| 6.35 | 4.0 | 6.0 | |
| 6.20 | 4.0 | 6.0 | |
| 6.55 | 4.0 | 2.0 | |
| 5.75 | 4.0 | 1.0 | |

Created a 30 mm diameter by 60 mm long shell from the sheet using a lab 3-draw press. (See Example 12 for method).

For shells with coating that survived the drawing from flat sheet to the 30×60 form, a "Top Rub" and "Solvent Rub" test was performed, using the methods described in Example 12, to determine the coating's durability. Results are shown in Table D.

TABLE D

Shell Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 6.0 | 4.8 |
| 5.0 | 3.5 |
| 3.0 | 4.0 |
| 3.5 | 4.0 |
| 4.0 | 3.5 |

Example 14: Lab Coating Aluminum Panels—Primary EAA Size and Color Coating

Cut 4" by 15" lab sheets from 33.33" by 35.72" commercial sheets of 0.009" thick 8011 alloy aluminum. Flamed lab panels using a propane torch to remove hydrophobic contaminants and to increase their surface energy. Within 24 hours after flaming, carefully placed a lab sheet onto a drawdown plate. Secured the lab sheet onto the drawdown plate using a spring loaded clip. Placed a clean Meyer #5 rod across the width of the lab sheet. Carefully pipetted approximately 5 mL of the "Example 1" size coating onto the lab sheet, directly in front of the Meyer rod. Using a smooth and uniform motion, drew the Meyer rod down the length of the lab sheet. Placed the wet coated lab sheets and holder into the oven preheated to 250 F (121 C), for 60 seconds. Removed the dried lab sheets from the oven and allowed them to cool to ambient temperature.

Secured the cured size-coated lab sheet onto the drawdown plate using a spring loaded clip. Placed a clean Meyer #10 rod across the width of the lab sheet. Carefully pipetted approximately 5 mL of the "Example 7" color coating onto the lab sheet, directly in front of the Meyer rod. Using a smooth and uniform motion drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them to cool to ambient temperature. Stored coated lab sheets for further testing and deep draw performance.

Tested the flat lab sheets for Taber Coating Adhesion, Sutherland Rub, Coating Thickness, and Blocking using the methods described in Example 12. Results are shown in Table E.

TABLE E

Flat Lab Sheet Test Responses

| Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) n = 4 |
|---|---|---|---|
| 8.05 | 4.0 | 1.0 | 2.85 ± 0.25 |
| 7.80 | 4.0 | 1.0 | |
| 7.70 | 4.0 | 1.0 | |
| 8.25 | 4.0 | 1.0 | |
| 7.90 | 4.0 | 1.0 | |
| 7.95 | 4.0 | 1.0 | |

Created a 30 mm diameter by 60 mm long shell from the sheet using a lab 3-draw press. (See Example 12 for method).

For shells with coating that survived the drawing from flat sheet to the 30x60 form, a "Top Rub" and "Solvent Rub" test was performed, using the methods described in Example 12, to determine the coating's durability. Results are shown in Table F.

TABLE F

Shell Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 4.0 | 3.5 |
| 4.0 | 3.3 |
| 2.0 | 3.5 |
| 2.3 | 3.8 |
| 2.8 | 3.3 |

Example 15: Lab Coating Aluminum Panels—Primary EAA Size, Color and Over-Varnish Coating Cut 4" by 15" lab sheets from 33.33" by 35.72" commercial sheets of 0.009" thick 8011 alloy aluminum. Flamed lab panels using a propane torch to remove hydrophobic contaminants and to increase their surface energy. Within 24 hours after flaming, carefully placed a lab sheet onto a drawdown plate. Secured the lab sheet onto the drawdown plate using a spring loaded clip. Placed a clean Meyer #5 rod across the width of the lab sheet. Carefully pipetted approximately 5 mL of the "Example 1" size coating onto the lab sheet, directly in front of the Meyer rod. Using a smooth and uniform motion, drew the Meyer rod down the length of the lab sheet. Placed coated lab sheets and holder into the oven with an air temperature of 210 F, for 60 seconds. Removed the dried lab sheets from the oven and allowed them to cool to ambient temperature.

Secured the cured size coated lab sheet onto the drawdown plate using a spring loaded clip. Placed a clean Meyer #10 rod across the width of the lab sheet. Carefully pipetted approximately 5 mL of the "Example 7" color coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them to cool to ambient temperature.

Secured the cured size and color coated lab sheet onto the drawdown plate using a spring loaded clip. Placed a clean Meyer #10 rod across the width of the lab sheet. Carefully pipetted approximately 5 mL of the "Example 10" over-varnish coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them to cool to ambient temperature. Stored coated lab sheets for further testing and deep draw performance.

Tested the flat lab sheets for Taber Coating Adhesion, Sutherland Rub, Coating Thickness, and Blocking using the methods described in Example 12. Results are shown in Table G.

TABLE G

Flat Lab Sheet Test Responses

| Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) n = 4 |
|---|---|---|---|
| 13.20 | 2.8 | 1.0 | 2.90 ± 0.26 |
| 12.55 | 2.8 | 1.0 | |
| 12.05 | 3.0 | 1.0 | |
| 12.45 | 2.0 | 1.0 | |
| 12.15 | 3.0 | 1.0 | |
| 11.90 | 4.0 | 1.0 | |

Created a 30 mm diameter by 60 mm long shell from the sheet using a lab 3-draw press. (See Example 12 for method)

For coating that survived the drawing from flat sheet to a 30×60 shell, a "Top Rub" and "Solvent Rub" test was performed, using the methods described in Example 12, to determine the coating's durability. Results are shown in Table H

TABLE H

Shell Test Responses

| Top of Shell Rub Test (500 Cycles) Ranking Scale (1-6, LTB) | Alcohol (70%) Rub Test (30 Cycles) Ranking Scale (1-7, LTB) |
|---|---|
| 1.5 | 2.8 |
| 1.3 | 3.0 |
| 1.3 | 2.0 |
| 1.5 | 3.0 |
| 1.5 | 4.0 |

Example 16: Lab Coating Aluminum Panels—Primary EAA Sodium Ionomer Size, Color and Over-Varnish Coating Cut 4" by 15" lab sheets from 33.33" by 35.72" commercial sheets of 0.009" thick 8011 alloy aluminum. Flamed lab panels using a propane torch to remove hydrophobic contaminants and to increase their surface energy. Within 24 hours after flaming, carefully placed a lab sheet onto a drawdown plate. Secured the lab sheet onto the drawdown plate using a spring loaded clip. Placed a clean Meyer #5 rod across the width of the lab sheet. Carefully pipetted approximately 5 mL of the "Example 2" size coating onto the lab sheet, directly in front of the Meyer rod. Using a smooth and uniform motion, drew the Meyer rod down the length of the lab sheet. Placed coated lab sheets and holder into the oven with an air temperature of 210 F, for 60 seconds. Removed the dried lab sheets from the oven and allowed them to cool to ambient temperature.

Secured the cured size coated lab sheet onto the drawdown plate using a spring loaded clip. Placed a clean Meyer #10 rod across the width of the lab sheet. Carefully pipetted approximately 5 mL of the "Example 8" color coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens # SMO5 89409-456). Placed coated lab sheets and holder into the oven with an air temperature of 210 F, for 60 seconds. Removed the dried lab sheets from the oven and allowed them to cool to ambient temperature.

Secured the cured size and color coated lab sheet onto the drawdown plate using a spring loaded clip. Placed a clean Meyer #10 rod across the width of the lab sheet. Carefully pipetted approximately 5 mL of the "Example 11" over-varnish coating onto the lab sheet, directly in front of the Meyer rod. Using a smooth and uniform motion, drew the Meyer rod down the length of the lab sheet. Removed the coated lab sheet from the drawdown plate and placed it into a holder prior to oven curing in lab oven (Sheldon Ovens #SMO5 89409-456). Placed coated lab sheets and holder into the oven with an air temperature of 210 F, for 60 seconds. Removed the dried lab sheets from the oven and allowed them to cool to ambient temperature. Stored coated lab sheets for further testing and deep draw performance.

Tested the flat lab sheets for Taber Coating Adhesion, Sutherland Rub, Coating Thickness, and Blocking using the methods described in Example 12. Results are shown in Table I.

TABLE I

Flat Lab Sheet Test Responses

| Coating Thickness (µm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) n = 4 |
|---|---|---|---|
| 14.05 | 1.5 | 1.0 | 1.75 ± 0.25 |
| 13.30 | 1.5 | 1.0 | |
| 13.75 | 1.5 | 1.0 | |
| 14.00 | 1.5 | 1.0 | |
| 12.95 | 1.5 | 1.0 | |
| 13.45 | 1.5 | 1.0 | |

Created a 30 mm diameter by 60 mm long shell from the sheet using a lab 3-draw press. (See Example 12 for method)

For coating that survived the drawing from flat sheet to a 30×60 shell, a "Top Rub" and "Solvent Rub" test was performed, using the methods described in Example 12, to determine the coating's durability. Results shown in Table J.

TABLE J

Shell Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 1.5 | 1.3 |
| 1.3 | 1.3 |
| 1.2 | 1.3 |
| 1.5 | 1.2 |
| 1.5 | 1.3 |

Example 17: Curing Process Results—Time and Temperature

An array (see Table K) was designed to determine the acceptable time and temperatures required to cure a base coating (see Example 5), a color coating (see Example 8) over the base, and an over-varnish coating (see Example 11) over the color. The coatings were applied to the panels using the same methods listed in Example 16 with the only exception being that the size coating was replaced by the base coating.

TABLE K

| Trial | Panel Temperature Oven 0-time (° F.) | Oven Time (seconds) | Panel Temperature Oven Final (° F.) |
|---|---|---|---|
| 1 | 77 | 15 | 82 |
| 2 | 77 | 120 | 172 |
| 3 | 77 | 68 | 150 |
| 4 | 77 | 15 | 121 |
| 5 | 77 | 120 | 251 |
| 6 | 77 | 15 | 88 |
| 7 | 77 | 120 | 112 |
| 8 | 77 | 120 | 112 |
| 9 | 77 | 120 | 251 |
| 10 | 77 | 68 | 103 |
| 11 | 77 | 15 | 82 |
| 12 | 77 | 15 | 121 |
| 13 | 77 | 68 | 219 |
| 14 | 77 | 68 | 150 |
| 15 | 77 | 60 | 129 |
| 16 | 77 | 95 | 148 |
| 17 | 77 | 30 | 108 |
| 18 | 77 | 60 | 143 |
| 19 | 77 | 30 | 125 |
| 20 | 77 | 60 | 173 |
| 21 | 77 | 15 | 84 |
| 22 | 77 | 26 | 95 |
| 23 | 77 | 30 | 98 |
| 24 | 77 | 22 | 87 |
| 25 | 77 | 15 | 82 |
| 26 | 77 | 30 | 89 |

Lab panels were coated with the base and cured using the panel starting temperatures, residence times, and panel final temperatures listed in the array. The base-coated samples were allowed to cool, over-coated with the color coating, and cured using the same curing temperatures and times listed in Table K. The color coated samples were then allowed to cool, over-coated with the over-varnish and cured using the same curing temperatures and times listed in Table K. The flat panels were then tested for Coating Thickness, Sutherland Rub, Taber Coating Adhesion, and Blocking performance using the methods described in Example 12. Results shown in Table L.

TABLE L

Flat Lab Sheet Test Responses

| Trial | Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) |
|---|---|---|---|---|
| 1 | 13.17 | 3.0 | 1.0 | 3.9 |
| 2 | 12.74 | 2.0 | 1.0 | 1.7 |
| 3 | 12.83 | 2.0 | 1.0 | 1.0 |
| 4 | 13.09 | 1.5 | 1.0 | 1.0 |
| 5 | 12.55 | 1.5 | 1.0 | 1.0 |
| 6 | 12.65 | 1.5 | 1.0 | 4.0 |
| 7 | 12.35 | 3.0 | 1.0 | 3.3 |
| 8 | 12.85 | 3.0 | 1.0 | 2.3 |
| 9 | 12.04 | 1.5 | 1.0 | 1.0 |
| 10 | 12.84 | 3.5 | 1.0 | 4.2 |
| 11 | 12.87 | 3.5 | 1.0 | 4.5 |
| 12 | 12.88 | 2.0 | 1.0 | 1.5 |
| 13 | 12.61 | 1.5 | 1.0 | 1.5 |
| 14 | 12.70 | 1.5 | 1.0 | 1.0 |
| 15 | 12.71 | 1.5 | 1.0 | 2.0 |
| 16 | 12.59 | 1.5 | 1.0 | 1.9 |
| 17 | 11.92 | 1.5 | 1.0 | 1.7 |
| 18 | 11.53 | 1.5 | 1.0 | 1.4 |
| 19 | 12.61 | 1.5 | 1.0 | 1.2 |
| 20 | 12.14 | 1.5 | 1.0 | 1.0 |
| 21 | 13.99 | 2.5 | 1.0 | 2.5 |
| 22 | 13.95 | 2.5 | 1.0 | 2.0 |
| 23 | 13.73 | 2.3 | 1.0 | 2.8 |
| 24 | 13.54 | 3.0 | 1.0 | 2.9 |
| 25 | | Coating failed to cure properly | | |
| 26 | 13.63 | 4.0 | 1.0 | 2.4 |

All coated panels having minimally acceptable cured coating characteristics were drawn into 30 mm diameter by 60 mm tall shells using the 3-draw lab press (method described in Example 12). The shells with coating that survived the drawing process were then tested for "Top Rub" and "Solvent Rub" performance using the methods described in Example 12. The results of these tests are shown in Table M

TABLE M

Shell Test Responses

| Trial | Top of Shell Rub Test (500 Cycles) Ranking Scale (1-6, LTB) | 70% Isopropyl Alcohol Rub Test (30 Cycles) Ranking Scale (1-7, LTB) |
|---|---|---|
| 1 | 1.5 | 1.5 |
| 2 | 1.5 | 1.5 |
| 3 | 1.3 | 1.3 |
| 4 | 1.8 | 7.0 |
| 5 | 1.5 | 1.3 |
| 6 | 1.5 | 2.0 |
| 7 | 1.8 | 7.0 |
| 8 | 1.5 | 7.0 |
| 9 | 1.3 | 1.5 |
| 10 | 1.8 | 7.0 |
| 11 | 1.8 | 7.0 |
| 12 | 1.5 | 1.5 |
| 13 | 1.5 | 1.5 |
| 14 | 1.5 | 1.8 |
| 15 | 1.5 | 1.5 |
| 16 | 1.5 | 1.5 |
| 17 | 1.5 | 1.5 |
| 18 | 1.5 | 1.8 |
| 19 | 1.3 | 1.0 |
| 20 | 1.3 | 1.8 |
| 21 | 1.5 | 6.0 |
| 22 | 1.5 | 5.5 |
| 23 | 1.8 | 4.3 |
| 24 | 1.8 | 7.0 |
| 25 | No sample to draw | |
| 26 | 1.5 | 7.0 |

Example 18: Coating Chemistry Process Results

Table N demonstrates how dispersion particle size, ionomer cation type, ionomerization percent, acrylic acid to ethylene ratio, and wax amount would change the final coating performance.

TABLE N

| Trial | 5380I EAA Particle Size (nm) | Ionomer Cation | Ionomer Level (%5980I AA Neutralized) | Amount 3460 EAA 17% TS Dispersion Added to 5380I Dispersion (%) | Carnauba Wax (% solids on EAA Total Solids) |
|---|---|---|---|---|---|
| 1 | 7.1 | K | 38.0 | 15.0 | 6.0 |
| 2 | 8.6 | K | 42.0 | 30.0 | 6.0 |
| 3 | 13.9 | K | 42.0 | 1.5 | 12.0 |

TABLE N-continued

| Trial | 5380I EAA Particle Size (nm) | Ionomer Cation | Ionomer Level (%5980I AA Neutralized) | Amount 3460 EAA 17% TS Dispersion Added to 5380I Dispersion (%) | Carnauba Wax (% solids on EAA Total Solids) |
|---|---|---|---|---|---|
| 4  | 7.5  | K  | 42.0 | 4.5  | 0.0  |
| 5  | 15.4 | Na | 38.0 | 30.0 | 3.0  |
| 6  | 13.7 | K  | 39.2 | 13.5 | 7.2  |
| 7  | 11.1 | Na | 38.0 | 30.0 | 10.8 |
| 8  | 12.9 | Na | 38.0 | 16.5 | 12.0 |
| 9  | 16.0 | K  | 38.0 | 0.0  | 0.0  |
| 10 | 10.9 | Na | 41.0 | 13.5 | 6.0  |
| 11 | 8.7  | K  | 40.8 | 0.0  | 4.8  |
| 12 | 7.9  | K  | 38.8 | 30.0 | 0.0  |
| 13 | 13.9 | K  | 42.0 | 22.5 | 0.0  |
| 14 | 12.9 | Na | 38.0 | 16.5 | 0.0  |
| 15 | 15.4 | Na | 38.0 | 0.0  | 10.8 |
| 16 | 11.6 | K  | 38.0 | 30.0 | 12.0 |
| 17 | 8.5  | K  | 38.4 | 0.0  | 12.0 |
| 18 | 10.9 | Na | 41.0 | 13.5 | 6.0  |
| 19 | 18.1 | Na | 42.0 | 0.0  | 0.0  |
| 20 | 9.7  | Na | 42.0 | 0.0  | 12.0 |
| 21 | 7.3  | K  | 41.2 | 25.5 | 12.0 |
| 22 | 18.1 | Na | 42.0 | 30.0 | 12.0 |
| 23 | 11.1 | Na | 38.0 | 0.0  | 0.6  |
| 24 | 9.7  | Na | 42.0 | 30.0 | 0.0  |

All coatings contained 51% Sunsperse Blue 15:3 dispersion based on total EAA solids.

Color coatings were made from each of the 24 trial coatings by mixing Sunsperse Blue 15:3 pigment dispersion with the appropriate amount of EAA dispersion to result in a pigment dispersion to EAA solids of 51%. As with previous examples, the samples were made in Uline (part number S-19520) ½ pint tin-plated steel cans by mixing with a Cole-Parmer mixer (Model#50006-01), fitted with a 30mm diameter 316 SS axial impeller set at 700 rpm. The mixing speed was gradually increased from 700 to 2000 rpm. Once at 2000 rpm, continued mixing for another 60 seconds. The can was then closed for storage using a tin-plated steel lid.

Coated lab panels were created and heated in 210 F air, for 60 seconds. The flat panels were then tested for Taber Coating Adhesion, Sutherland Rub, Coating Thickness, and Blocking performance using the methods described in Example 12. The results are shown in Table O.

TABLE O

| | Flat Lab Sheet Test Responses | | | |
|---|---|---|---|---|
| Trial | Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) |
| 1  | 6.24 | 1.8 | 1.0 | 2.0 |
| 2  | 6.44 | 1.5 | 1.0 | 2.1 |
| 3  | 7.41 | 3.0 | 1.0 | 1.0 |
| 4  | 6.28 | 3.3 | 1.0 | 4.5 |
| 5  | 6.53 | 2.0 | 1.0 | 1.0 |
| 6  | 6.95 | 2.3 | 1.0 | 1.4 |
| 7  | 6.33 | 1.5 | 1.0 | 2.0 |
| 8  | 6.27 | 2.0 | 1.0 | 1.0 |
| 9  | 7.38 | 4.0 | 1.0 | 3.2 |
| 10 | 6.45 | 1.3 | 1.0 | 1.8 |
| 11 | 7.37 | 1.5 | 1.0 | 2.1 |
| 12 | 6.22 | 1.3 | 1.0 | 4.2 |
| 13 | 6.58 | 3.8 | 1.0 | 2.0 |
| 14 | 6.23 | 3.8 | 1.0 | 2.0 |
| 15 | 6.79 | 2.5 | 1.0 | 1.0 |
| 16 | 6.08 | 1.2 | 1.0 | 1.0 |
| 17 | 6.62 | 1.3 | 1.0 | 1.6 |
| 18 | 6.58 | 1.3 | 1.0 | 2.1 |
| 19 | 7.10 | 3.5 | 1.0 | 2.0 |
| 20 | 6.61 | 1.3 | 1.0 | 2.8 |
| 21 | 6.40 | 1.3 | 1.0 | 1.0 |
| 22 | 6.58 | 2.0 | 1.0 | 1.0 |
| 23 | 6.75 | 2.0 | 1.0 | 2.4 |
| 24 | 5.78 | 3.8 | 1.0 | 3.3 |

The coated flat metal for each trial was then drawn into a 30 mm diameter by 60 mm tall shells using the method described in Example 12. The shells with coating that survived the drawing process were then tested for "Top Rub" and "Solvent Rub" performance using the methods described in Example 12. The results of these tests are shown in Table P.

TABLE P

Shell Test Responses

| Trial | Top of Shell Rub Test (500 Cycles) Ranking Scale (1-6, LTB) | 70% Isopropyl Alcohol Rub Test (30 Cycles) Ranking Scale (1-7, LTB) |
|---|---|---|
| 1 | 1.5 | 5.5 |
| 2 | 2.0 | 5.9 |
| 3 | 1.5 | 7.0 |
| 4 | 1.5 | 5.0 |
| 5 | 1.5 | 4.8 |
| 6 | 1.5 | 5.0 |
| 7 | 1.5 | 4.3 |
| 8 | 1.7 | 4.8 |
| 9 | 1.5 | 4.3 |
| 10 | 1.5 | 5.0 |
| 11 | 1.8 | 4.3 |
| 12 | 1.5 | 5.0 |
| 13 | 1.5 | 6.0 |
| 14 | 1.5 | 5.0 |
| 15 | 1.5 | 6.0 |
| 16 | 1.5 | 5.0 |
| 17 | 1.5 | 5.2 |
| 18 | 1.5 | 5.0 |
| 19 | 1.5 | 7.0 |
| 20 | 1.5 | 5.3 |
| 21 | 1.5 | 4.5 |
| 22 | 1.5 | 4.8 |
| 23 | 1.5 | 3.8 |
| 24 | 1.5 | 5.0 |

Example 19: Commercial Roll Coating Aluminum Panels—Primary EAA Sodium Ionomer Base/Color/Over Varnish and Interior Lacquer Coating Five gallons of each coating (white base, color, over-varnish) was produced using Primary EAA Sodium Ionomer (same formulation used to create Example 2) prepared in a 60 gallon reactor. "White Base Coating" was prepared by adding 2.1 pounds of "Sunsperse White 6" to 37.9 pounds of Primary EAA Sodium Ionomer with agitation, mixed to homogeneous composition and then filtered through a 150 micron bag into a plastic 5 gallon pail. The "Color Coating" was prepared by adding 5.4 pounds of "Sunsperse Blue 15:3" to 34.6 pounds of Primary EAA Sodium Ionomer with agitation, mixed to homogeneous composition and then filtered through a 150 micron bag into a plastic 5 gallon pail. The "Over-varnish" was prepared by adding 4.2 pounds of the Carnauba Wax Dispersion (same formulation used to create Example 9) to 35.8 pounds of Primary EAA Sodium Ionomer with agitation, mixed to homogeneous composition and then filtered through a 150 micron bag into a plastic 5 gallon pail.

Figure 10:
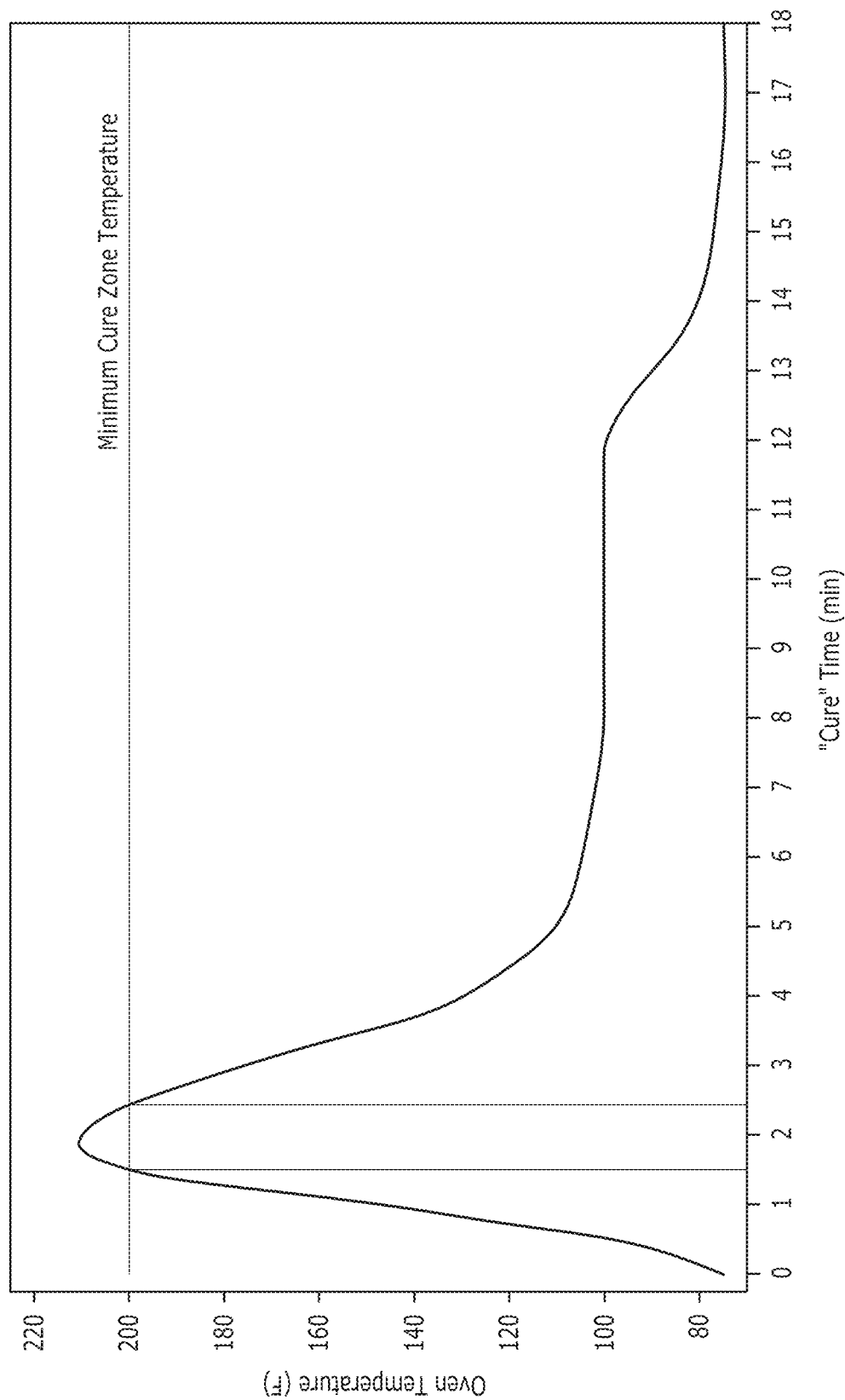
FIG. 10 illustrates a curing oven curve for a waterborne coating applied using a commercial direct roll coating process, according to one embodiment.

Set-up a commercial direct roll coater capable of handling, 0.009" thick, 35.7"×33.3" flat 8011 aluminum sheets. Ran coater at 60 sheets per minute using a 12" diameter urethane coating application roller, rotating at 72 rpm. Immediately after the coating was applied to the sheet, it was dried and the EAA film formed in a Wagner Litho oven having a time/temperature profile shown in FIG. 10.

The first coating applied was the white base. This coating was cured through the wicket-conveyance oven and the base-coated sheets were returned to their original orientation and sent back to the coater feed system. The liquid base coating was removed from the roll coater system and the system was cleaned using water and primed with the color coating. The base coated sheets were then over-coated with the color coating and cured using the same oven curve. The cured sheets were again returned to the coater feed, without flipping, and the system was purged of the liquid color coat, cleaned using water, and primed with the over-varnish (used the over-varnish as an interior lacquer). The "interior lacquer" was applied to the bare metal and cured using the same oven curve and returned to the coater feed, without flipping, for the final over-varnish application. No purging or cleaning of the system was required between these coating applications since the interior lacquer and the over-varnish coatings were the same. The over varnished samples were fed through the curing oven with the same oven curve completing the metal coating for screw-cap manufacture.

Approximately 500 fully coated sheets were stacked on a pallet and shipped by truck to a commercial screw-cap manufacturing facility for further processing. Upon arrival at the cap manufacturing company, a blocking test was set-up. This was done by placing temperature sensors on the 500 sheet pallet, setting a standard 900 pound pallet of commercial metal on top of the 500 sheets and storing the pallets in the receiving yard. The pallets remained in the receiving yard for four (4) days with temperatures cycling between 70 and 110 F. After the fourth day, the 900 lb. pallet was removed and the 500 sheets were checked for blocking. No sheets blocked.

Prior to running the sheets on a commercial screw cap forming line, the flat coated metal was lab tested for Taber Coating Adhesion, Sutherland Rub, Coating Thickness, and Blocking using the methods described in Example 12. Results are shown below in Table Q.

TABLE Q

Flat Lab Sheet Test Responses

| Coating Thickness (μm) | Sutherland Rub Test (500 Cycles) Ranking Scale (1-4, LTB) | Taber Scratch Cross Hatch Test Ranking Scale (1-6, LTB) | Capmetal Sheet Blocking Ranking Scale (1-5, LTB) n = 4 |
|---|---|---|---|
| 8.25 | 1.5 | 1.0 | 1.00 ± 0.00 |
| 7.85 | 1.5 | 1.0 | |
| 9.75 | 1.5 | 1.0 | |
| 10.30 | 1.5 | 1.0 | |
| 9.35 | 1.8 | 1.0 | |

After testing the flat sheets, created screw-caps by running them through a commercial manufacturing line. The caps were tested for "Top Rub" and "Solvent Rub" performance using the methods described in Example 12. The results of these tests are in Table R.

TABLE R

Shell Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 1.5 | 2.0 |
| 1.5 | 2.3 |

TABLE R-continued

Shell Test Responses

| Top of Shell Rub Test (500 Cycles) Ranking Scale (1-6, LTB) | 70% Isopropyl Alcohol Rub Test (30 Cycles) Ranking Scale (1-7, LTB) |
|---|---|
| 1.5 | 2.3 |
| 1.5 | 1.5 |

The caps were applied to bottles having a standard GPI 1680 finish.

Cap application was done using an Andre Zalkin, Model TM3, single-head capper (5 Route André Zalkin, 27390 Montreuil-l'Argillé, France). The capper was fitted with a Zalkin 30×60 Stelvin-type capper head and set-up using industry standard top load, thread rollers, thread roller force, pilfer rollers, pilfer roller force, and reform settings. The capped samples were allowed to sit for 24 hours and were then tested for slip and break torques using a Torqo II (Mesa Labs, 12100 West 6th Ave. Lakewood, Colo. 80228). The results are shown in Table S.

TABLE S

| Trial ID | Slip Torque (in-lbs) | Break Torque (in-lbs) |
|---|---|---|
| 1 | 14.07 | 8.87 |
| 2 | 15.57 | 9.63 |
| 3 | 12.06 | 8.88 |
| 4 | 12.66 | 8.97 |
| 5 | 17.61 | 12.51 |
| 6 | 15.66 | 10.14 |
| 7 | 12.06 | 8.10 |
| 8 | 12.57 | 7.35 |
| 9 | 13.62 | 8.04 |
| 10 | 13.11 | 8.49 |
| 11 | 13.26 | 11.22 |
| 12 | 14.10 | 7.08 |

After removing the caps, the interior lacquer was visually checked to determine if the capping and cap removal process damaged the coating. No flaking or removal of the coating was observed.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A method of forming a screw cap closure, the method comprising:
   coating an exterior side of a sheet metal substrate with a first layer comprising a first ethylene acrylic acid copolymer;
   coating the first layer with a second layer comprising a second ethylene acrylic acid copolymer;
   coating the second layer with an over-varnish layer comprising a third ethylene acrylic acid copolymer;
   coating an interior side of the sheet metal substrate with an interior lacquer layer comprising a fourth ethylene acrylic acid copolymer;
   curing the first layer, second layer, over-varnish layer, and interior lacquer layer by applying heat to form a coating on the sheet metal substrate; and
   elongating the sheet metal substrate and the coating in a deep draw process to form a screw cap closure;
   wherein each of the first layer, the second layer, the over-varnish layer, and the interior lacquer layer comprises a single type of polymer; and
   wherein an acrylic acid content in the single type of polymer is from 19.5 to 21.5 weight percent based upon a total weight of the single type of polymer.

2. The method of claim 1, wherein the coating on the sheet metal substrate comprises at least one of a pigment or a wax.

3. The method of claim 1, wherein the first, second, third, and fourth ethylene acrylic acid copolymers comprise acrylic acid functional groups, and wherein 25 to 100 molar percent of the acrylic acid functional groups of at least one of the first, second, third, or fourth ethylene acrylic acid copolymers have been neutralized with at least one of ammonium hydroxide or sodium hydroxide.

4. The method of claim 3, wherein in at least one of the first, second, third, or fourth ethylene acrylic acid copolymers, the ammonium hydroxide neutralized about 30 molar percent of the acrylic acid functional groups and the sodium hydroxide neutralized about 40 molar percent of the acrylic acid functional groups.

5. The method of claim 1, wherein the coating composition on the sheet metal substrate contains no volatile organic compounds (VOCs) and comprises a 4,4'-(propane-2,2-diyl) diphenol (BPA) non-intent status.

6. The method of claim 1, wherein curing comprises heating the sheet metal substrate to a temperature from about 150° F. (65.6° C.) to about 250° F. (121° C.).

7. The method of claim 1, further comprising:
   mixing at least one of the first, second, third, or fourth ethylene acrylic acid copolymers with water and a base to obtain a mixture; and
   heating the mixture under agitation to form a dispersion.

8. The method of claim 1, wherein at least one of the first layer, the second layer, the over-varnish layer, and the interior lacquer layer comprises a pigment.

9. The method of claim 8, wherein at least one of the first layer, the second layer, the over-varnish layer, and the interior lacquer layer comprises a wax.

10. A method of forming a screw cap closure, the method comprising:
    obtaining a sheet metal substrate coated with a coating comprising a plurality of layers, the plurality of layers comprising:
      a first layer disposed on an exterior side of the sheet metal substrate, the first layer comprising a first ethylene acrylic acid copolymer;
      a second layer disposed on the first layer, the second layer comprising a second ethylene acrylic acid copolymer;
      an over-varnish layer disposed on the second layer, the over-varnish layer comprising a third ethylene acrylic acid copolymer; and
      an interior lacquer layer disposed on an interior side of the sheet metal substrate, the interior lacquer layer comprising a fourth ethylene acrylic acid copolymer; and
    elongating the sheet metal substrate and the coating in a deep drawing process to form a screw cap closure;
    wherein each of the first layer, the second layer, the over-varnish layer, and the interior lacquer layer comprises a single type of polymer; and wherein an acrylic acid content in the single type of polymer is from 19.5 to 21.5 weight percent based upon a total weight of the single type of polymer.

11. The method of claim 10, wherein each layer from the plurality of layers was applied to the sheet metal substrate as a dispersion of each ethylene acrylic acid copolymer in water, and wherein each layer from the plurality of layers was cured by applying heat.

12. The method of claim 10, wherein the coating comprises at least one of a pigment or a wax.

13. The method of claim 10, wherein the first, second, third, and fourth ethylene acrylic acid copolymers comprise acrylic acid functional groups, and wherein 25 to 100 molar percent of the acrylic acid functional groups of at least one of the first, second, third, or fourth ethylene acrylic acid copolymers have been neutralized with at least one of ammonium hydroxide or sodium hydroxide.

14. The method of claim 13, wherein in at least one of the first, second, third, or fourth ethylene acrylic acid copolymers, the ammonium hydroxide neutralized about 30 molar percent of the acrylic acid functional groups and the sodium hydroxide neutralized about 40 molar percent of the acrylic acid functional groups.

15. The method of claim 10, wherein the coating contains no volatile organic compounds (VOCs) and comprises a BPA non-intent status.

16. The method of claim 10, wherein the screw cap closure comprises a diameter of about 30 mm and a length of about 60 mm.

17. The method of claim 1, wherein curing the plurality of layers comprises curing the first layer before the second layer is coated on the first layer.

* * * * *